(12) United States Patent
Nichols et al.

(10) Patent No.: US 11,623,777 B2
(45) Date of Patent: Apr. 11, 2023

(54) PACKAGING EQUIPMENT AND SYSTEMS

(71) Applicants: David Nichols, Portland, OR (US); Karl Robrock, Alameda, CA (US)

(72) Inventors: David Nichols, Portland, OR (US); Karl Robrock, Alameda, CA (US)

(*) Notice: Subject to any disclaimer, the term of this patent is extended or adjusted under 35 U.S.C. 154(b) by 0 days.

(21) Appl. No.: 17/241,608

(22) Filed: Apr. 27, 2021

(65) Prior Publication Data

US 2021/0331821 A1 Oct. 28, 2021

Related U.S. Application Data

(60) Provisional application No. 63/016,199, filed on Apr. 27, 2020.

(51) Int. Cl.
| | |
|---|---|
| *B65B 35/36* | (2006.01) |
| *B65B 35/46* | (2006.01) |
| *B65B 5/06* | (2006.01) |
| *B65G 47/90* | (2006.01) |
| *B65B 5/08* | (2006.01) |

(52) U.S. Cl.
CPC .............. *B65B 35/36* (2013.01); *B65B 5/06* (2013.01); *B65B 5/08* (2013.01); *B65B 35/46* (2013.01); *B65G 47/907* (2013.01)

(58) Field of Classification Search
CPC .. B65B 5/06; B65B 5/08; B65B 21/06; B65B 21/18; B65B 35/12; B65B 35/24; B65B 35/26; B65B 35/30; B65B 35/36; B65B 35/44; B65B 35/46; B65G 47/90; B65G 47/907

USPC ............... 53/443, 448, 473, 543, 247, 251
See application file for complete search history.

(56) References Cited

U.S. PATENT DOCUMENTS

| | | | | |
|---|---|---|---|---|
| 4,982,553 | A * | 1/1991 | Itoh | B67B 7/02 53/251 |
| 9,008,831 | B1 * | 4/2015 | Jacobs et al. | B65B 35/36 700/214 |
| 11,136,199 | B2 * | 10/2021 | Choplin | B65G 47/088 |
| 2001/0038792 | A1 * | 11/2001 | Hofer | B65B 35/30 414/404 |
| 2003/0136086 | A1 * | 7/2003 | Kalany et al. | B65B 35/24 53/251 |
| 2021/0179303 | A1 * | 6/2021 | Dietersberger et al. | B65B 35/36 |
| 2021/0354866 | A1 * | 11/2021 | Hahn | B65B 35/36 |

FOREIGN PATENT DOCUMENTS

| | | | | | |
|---|---|---|---|---|---|
| GB | 2240086 | A | * | 7/1991 | ............ B65B 21/12 |
| JP | 05201405 | A | * | 8/1993 | |

* cited by examiner

*Primary Examiner* — Stephen F. Gerrity
(74) *Attorney, Agent, or Firm* — Klarquist Sparkman, LLP

(57) ABSTRACT

A packaging system includes a first transfer station to receive a plurality of products thereon, a staging station comprising a track and a plurality of shuttle members configured to move along a path defined by the track, and a second transfer station comprising a robotic arm coupled to a plurality of gripping members. The plurality of gripping members can be configured to pick up the plurality of products from one or more of the plurality of shuttle members.

10 Claims, 28 Drawing Sheets

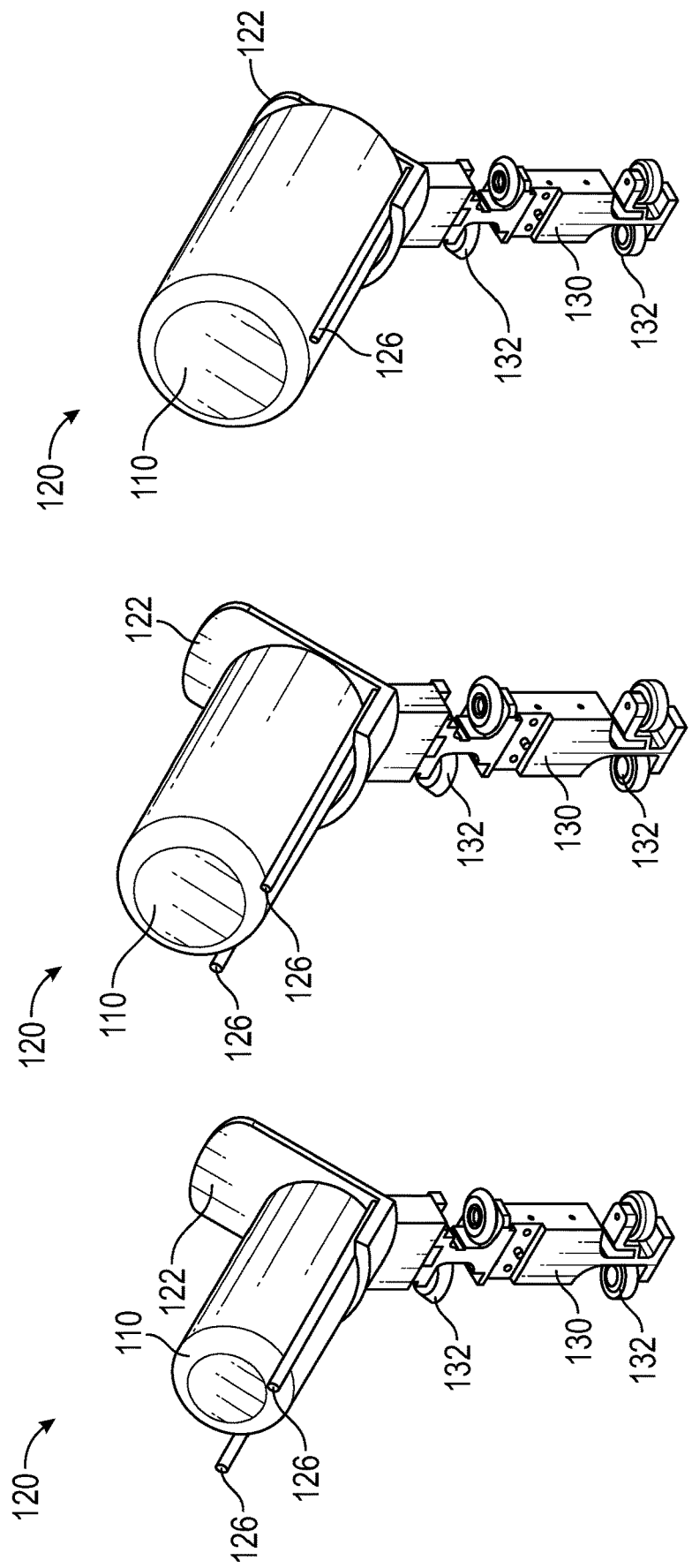

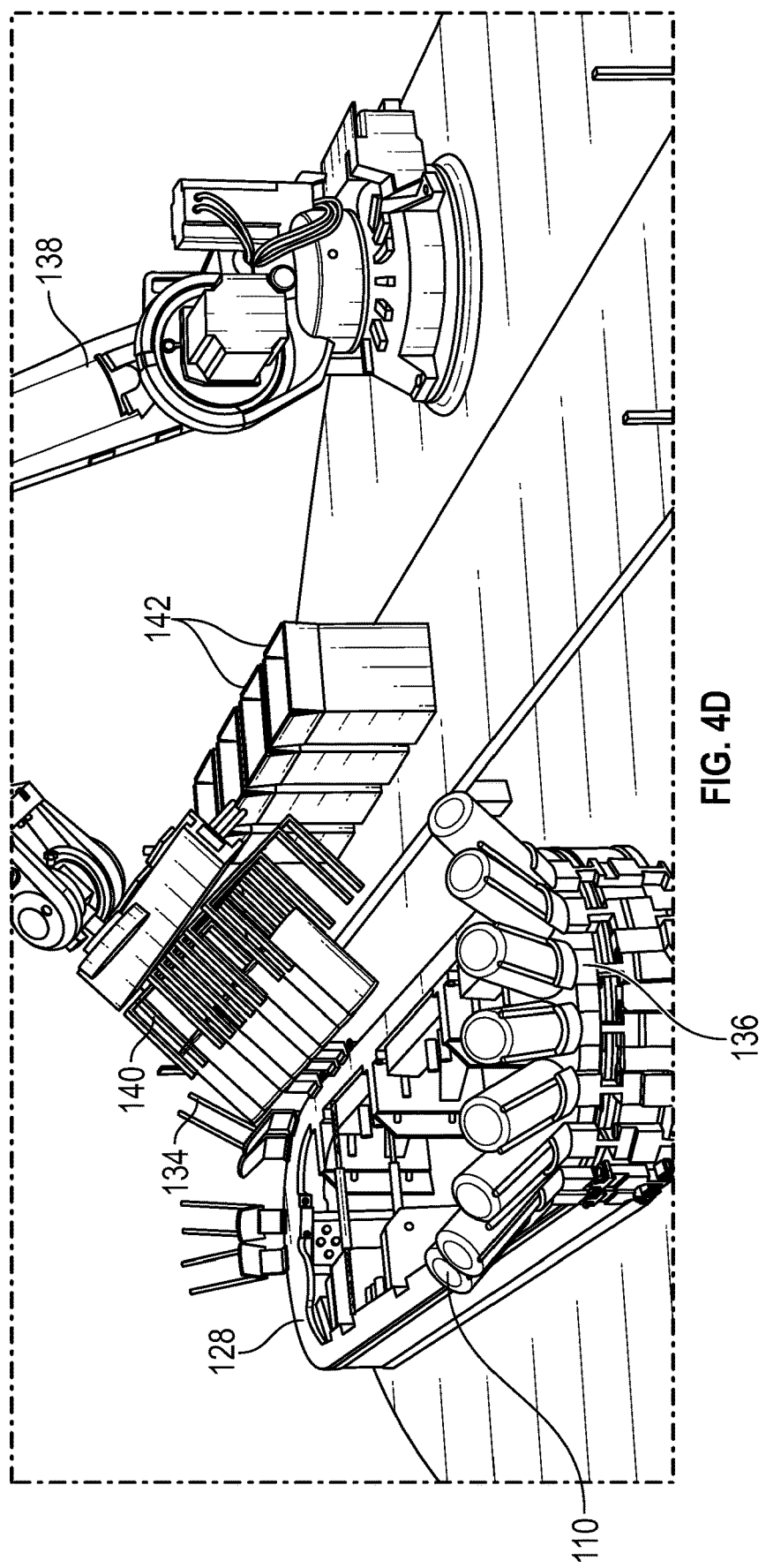

PACKAGING EQUIPMENT AND SYSTEMS

CROSS REFERENCE TO RELATED APPLICATION

This application claims the benefit of U.S. Provisional Application No. 63/016,199, filed Apr. 27, 2020, which is incorporated herein by reference in its entirety.

FIELD

This disclosure is directed to packaging equipment and systems, and methods of packaging goods in connection with the same.

SUMMARY

Various embodiments are disclosed herein of packaging systems, their components, and their operation. Although described in combination in some embodiments, it should be understood that the individual components themselves are novel and patentable. Thus, in addition to the system as a whole, the first transfer station, staging station, second transfer station, and packing station are independently patentable.

In one embodiment, a packaging system can include a first transfer station to receive a plurality of products thereon, a staging station comprising a track and a plurality of shuttle members configured to move along a path defined by the track, and a second transfer station comprising a robotic arm coupled to a plurality of gripping members. The plurality of gripping members can be configured to pick up the plurality of products from one or more of the plurality of shuttle members. In addition, the staging station can be configured to receive the plurality of products from the first transfer station and transport them on the shuttle members from the first transfer station to the second transfer station.

In certain implementations, the first transfer station comprises a first surface and a second surface, angled relative to the first surface, to receive and deliver the plurality of products in discrete quantities to respective ones of the plurality of shuttle members. The plurality of shuttle members can also each comprises a base surface and at least two spaced-apart arms that collectively support a respective product when positioned thereon.

In some embodiments, the plurality of shuttle members are independently moveable along the path defined by the track. In some cases, each of the plurality of shuttle members comprises one or more wheels and a motor that drives at least one of the one or more wheels.

The plurality of gripping members of the robotic arm can comprise a first row of gripping members and a second row of gripping members. In some cases, the first row of gripping members is configured to receive a first group of the plurality of products delivered to the second transfer station and the second row of gripping members is configured to receive a second group of the plurality of products. In some implementations, the gripping members of each of the first row and second row are independently moveable relative to adjacent gripping members within a respective row.

In yet additional embodiments, a packing station comprising at least one container conveyor for transporting containers to be filled to the second transfer station can be provided. In some cases, the path defined by the track is oval.

In another embodiment, a method of receiving and packing products is provided. The method can include receiving a plurality of products at a first transfer station, delivering the plurality of products in discrete quantities to a plurality of shuttle members, the first transfer station being configured to deliver one of the plurality of products to each of the plurality of shuttle members, moving a first group of the plurality of shuttle members from a first position, in which a respective product of a first group of products is received on a respective shuttle member of the first group, along a path defined by a track to a second transfer station, moving a first plurality of gripping members of a robotic arm at the second transfer station into position to pick up the first group of the plurality of products from the first group of shuttle members, the first group of shuttle members being empty after the first group of products is picked up, moving the empty first group of shuttle members along the track to the first position to receive additional products thereon, moving a second group of the plurality of shuttle members from the first position, in which a respective product of a second group of products is received on a respective shuttle member of the second group, along the path defined by a track to the second transfer station, moving a second plurality of gripping members of a robotic arm at a second transfer station into position to pick up the second group of the plurality of products from the second group of shuttle members, the second group of shuttle members being empty after the second group of products is picked up, and moving the empty second group of shuttle members along the track to the first position to receive additional products thereon.

In some implementations, the act of delivering the plurality of products in discrete quantities to a plurality of shuttle members comprises moving the plurality of product along a platform that comprises a first surface and a second surface, angled relative to the first surface. The plurality of shuttle members can also each comprise a base surface and at least two spaced-apart arms that collectively support a respective product when positioned thereon, and the delivery of the plurality of products to each of the plurality of shuttle members can comprise receiving a product that extends at least partly between the two spaced-apart arms of the shuttle member.

In other implementations, the plurality of shuttle members are independently moveable along the path defined by the track. For example, in one embodiment, the shuttle members can comprise a linear motor and one or more idler wheels to allow the shuttle members to move along the track. In another embodiment, the plurality of shuttle members can comprise one or wheels and a rotary motor that drives at least one of the one or more wheels and the act of moving the first group of the plurality of shuttle members comprises driving the one or more wheels with the motor.

In some implementations, the first plurality of gripping members comprises a first row of gripping members and the second plurality of gripping members comprises a second row of gripping members. The gripping members of each of the first row and second row can also be independently moveable relative to adjacent gripping members within a respective row, and the method can further comprise moving at least some of the plurality of gripping members to adjust a distance between adjacent gripping members in each row.

In yet another implementation, the method can include the transferring the plurality of products picked up by the first and second plurality of gripping members to one or more containers of a packing station. The path defined by the track can be oval and, in some implementations, the plurality of products are delivered into a container as a four pack, six pack, or eight pack.

The foregoing and other objects, features, and advantages of the invention will become more apparent from the following detailed description, which proceeds with reference to the accompanying figures.

BRIEF DESCRIPTION OF THE DRAWINGS

FIG. 3A-3F show embodiments of exemplary shuttle members receiving products of different sizes.

FIGS. 4A-4J illustrate exemplary systems and methods of transferring product for packaging using a plurality of shuttle members and a plurality of gripping members of a robotic arm.

DETAILED DESCRIPTION

General Considerations

Figure 1:
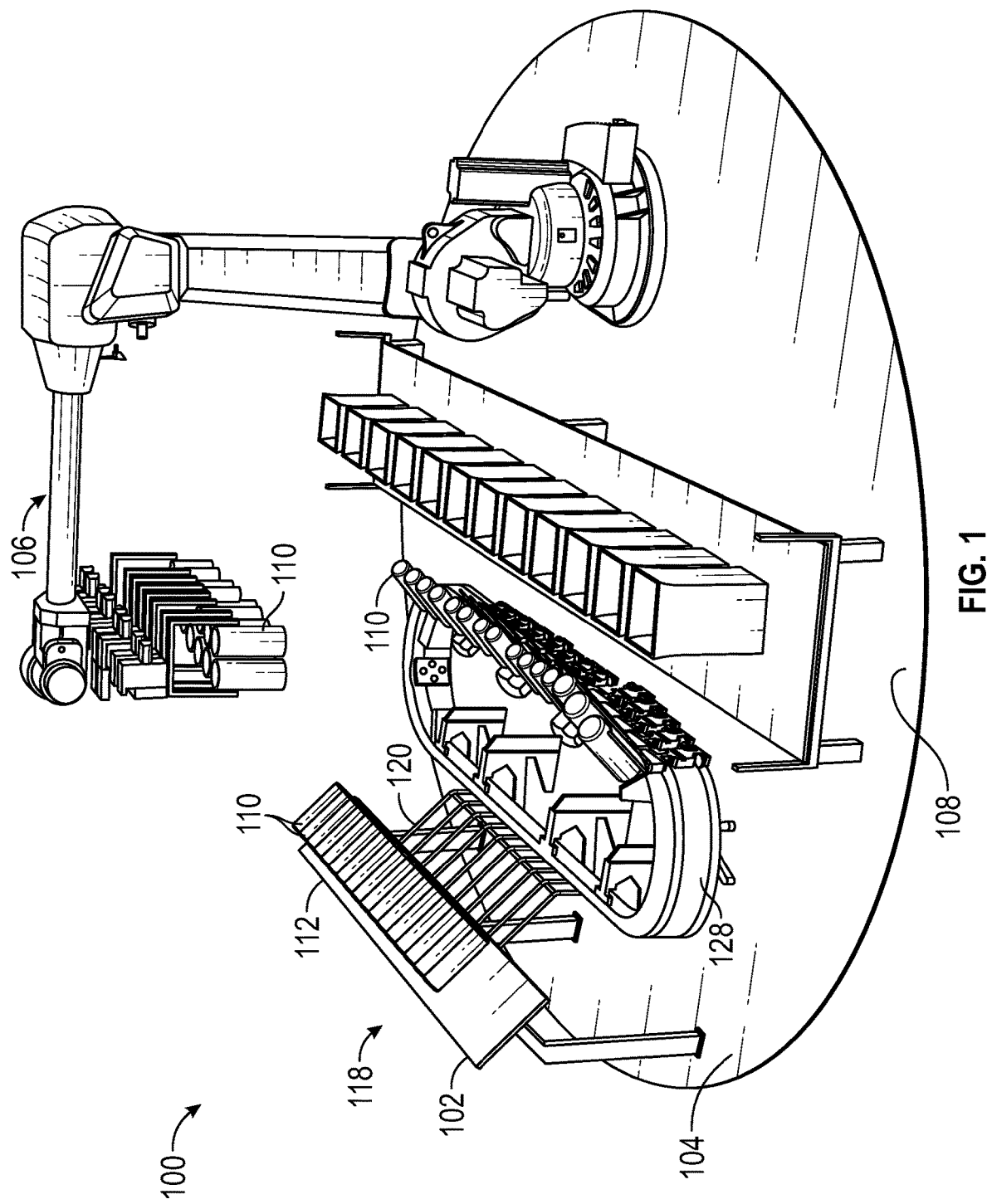
FIG. 1 illustrates an exemplary packaging system comprising a first transfer station, a staging station, a second transfer station, and a packing station.

The systems and methods described herein, and individual components thereof, should not be construed as being limited to the particular uses or systems described herein in any way. Instead, this disclosure is directed toward all novel and non-obvious features and aspects of the various disclosed embodiments, alone and in various combinations and subcombinations with one another. For example, any features or aspects of the disclosed embodiments can be used in various combinations and subcombinations with one another, as will be recognized by an ordinarily skilled artisan in the relevant field(s) in view of the information disclosed herein. In addition, the disclosed systems, methods, and components thereof are not limited to any specific aspect or feature or combinations thereof, nor do the disclosed things and methods require that any one or more specific advantages be present or problems be solved.

As used in this application the singular forms "a," "an," and "the" include the plural forms unless the context clearly dictates otherwise. Additionally, the term "includes" means "comprises." Furthermore, as used herein, the term "and/or" means any one item or combination of items in the phrase. As used herein, the term "exemplary" means serving as a non-limiting example, instance, or illustration. As used herein, the terms "e.g.," and "for example," introduce a list of one or more non-limiting embodiments, examples, instances, and/or illustrations.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "provide," "produce," "determine," and "select" to describe the disclosed methods. These terms are high-level descriptions of the actual operations that are performed. The actual operations that correspond to these terms will vary depending on the particular implementation and are readily discernible by one of ordinary skill in the art having the benefit of this disclosure.

Exemplary Packaging System and Methods of Packing

Many types of products are packaged and delivered in containers to remote locations. As used herein, the term "product" refers to any good that can be sorted and packed into a container in discrete, known quantities. The container can vary depending on the selection of a particular product, delivery location, and other factors. As used herein, the term "container" refers to any object used to hold or store a plurality of discrete "products" of a known quantity.

FIG. 1 illustrates an exemplary packaging system 100 comprising a first transfer station 102, a staging station 104, a second transfer station 106 (e.g., a robotic-arm transfer station), and a packing station 108. As discussed in more detail below, the first transfer station 102 is configured to receive and convey a plurality of products 110 from an initial location to the staging station 104. The staging station 104, in turn, conveys the received products 110 in a desired manner to the second transfer station 106 for pick up and transfer to the packing station 108.

First transfer station 102 can comprise any suitable mechanism for transferring products to the staging station 104 in discrete quantities. For example, referring to FIGS. 1 and 2, the first transfer station 102 comprises a receiving platform 112 that receives a plurality of products 110 between a first surface 114 and a second surface 116. The first and second surfaces 114, 116 can be angled relative to one another (e.g., a 90% angle) and relative to a reference plane of the ground to collectively receive the products 188 at an angle and move them in the direction of arrow 118 to the staging station 104. The products 110 may be directed across the platform 112 by any desired conveyance mechanism, including for example, gravity (e.g., a downward-sloped platform), one or more conveyor belts, by application of force to one or more of the products on the platform, and/or any other suitable mechanism that can impart motion to the products causing them to move along the platform 112 to a delivery position.

Figure 2:
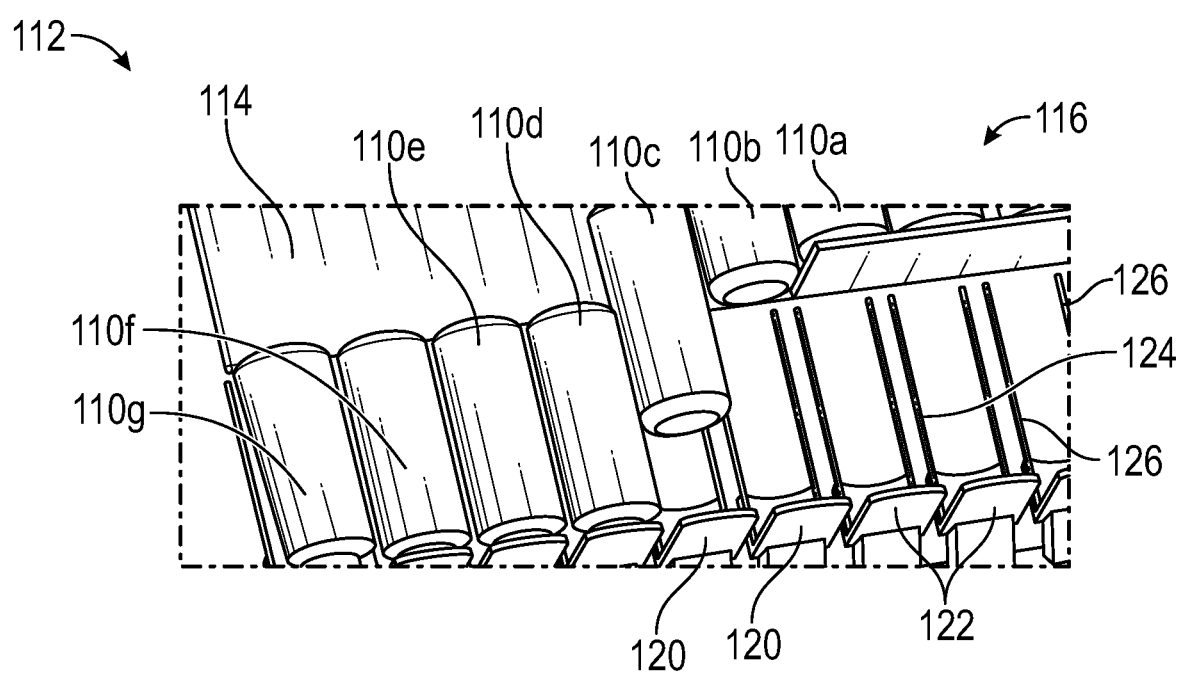
FIG. 2 illustrates an exemplary embodiment of the delivery of a plurality of products from a platform of a first transfer to a shuttle member transfer system.

FIG. 2 illustrates a first product 110a in a first position supported by the platform 112, a second product 110b in a second position (e.g., a delivery position), a third product 110c in a third position (e.g., mid-delivery), and additional products 110d-g after they have been delivered onto a respective one of a plurality of support members 120 of the staging station 104.

The plurality of shuttle members 120 can have a first support surface 122 and one or more additional support surfaces 124 positioned at an angle relative to the first support surface 122 to collective receive a single product thereon.

As shown in FIGS. 3A-C, the one or more additional support surfaces 124 can comprise a plurality of spaced-apart support arms 126. This arrangement, in combination with the first support surface 122 (e.g., a product-base support surface), can accommodate products 110 of a variety of sizes and shapes. For example, FIG. 3A illustrates a smaller product 110 supported on a shuttle member 120, FIG. 3B illustrates a larger product 110 supported on a shuttle member 120 of the same type shown in FIG. 3A, and FIG. 3C illustrates an even larger product 110 supported on a shuttle member 120 of the same type shown in FIGS. 3A and 3B. The gap between the support arms 126 permit smaller products to extend between the arms by a greater amount than larger products (e.g., products with larger diameters).

Referring again to FIG. 1, in some embodiments, shuttle members 120 can be positioned below platform 112 so that delivery of products from platform 112 to a respective support member 120 can be affected by simply moving products from a position in which a respective product is supported by the platform (e.g., the first position) to another position in which the product moves away from an end of the first surface 114 of platform 112 (e.g., the delivery position) and moves, or slides, downward into position on the shuttle member 120.

Shuttle members 120 can be individual, or collectively, moved within the staging station 104. Referring again to FIG. 1, staging station 104 can comprise a track 128 that defines a path along which shuttle members 120 can move. For example, in the illustrated embodiment, the track 128 comprises an oval shape that defines an oval path. Of course, other path shapes are possible.

The shuttle members 120 are received on the track 128 and are moveable relative to the track along the defined track path. In one embodiment, each shuttle member is independently moveable along the track path.

As shown in FIGS. 3A-3C, the shuttle members can comprise a linear motor 130 with one or more electromagnets positioned on generate a magnetic field that engages with corresponding coils along the track. One or more idler wheels 132 can be provided to allow the shuttles to move along the track. Alternatively, each shuttle can have a motor 130 that individually controls and drives one or more wheels 132 in contact with the track 128.

In some implementations, rather than each shuttle member moving independently, two or more shuttle members can move collectively together in a train. A plurality of shuttle trains can be provided so that the system includes two or more groups of collectively moveable shuttle members.

Figure 3F:
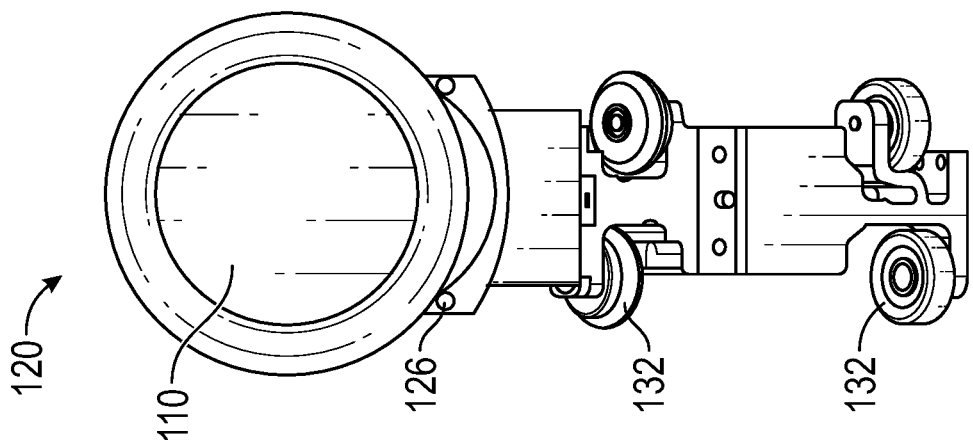
Figure 3E:
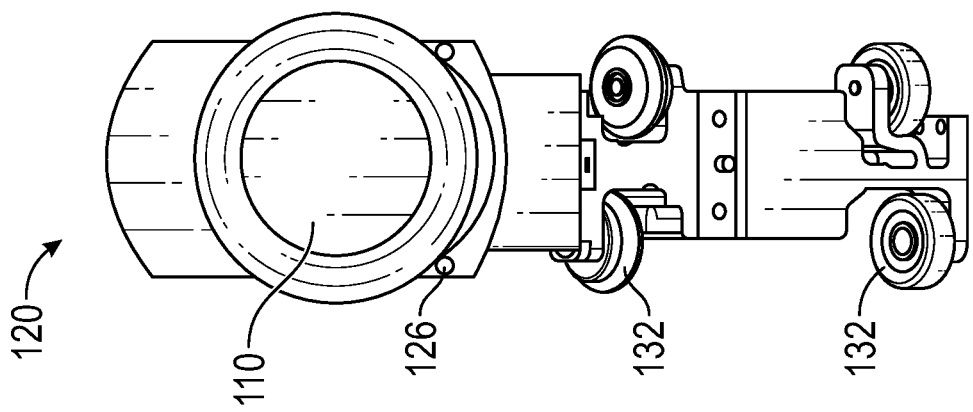
Figure 3D:
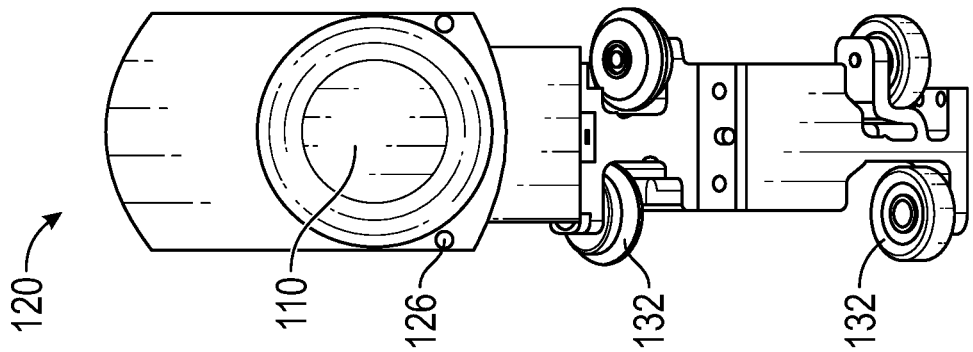

FIGS. 3D-F show another view of the shuttle members 120 carrying different size products 110 to further illustrate how the shuttle members can easily accommodate a range of different size products.

FIGS. 4A-4J illustrate an embodiment in which a plurality of product 110 are conveyed on the shuttle members 120 to the second transfer station 106 (e.g., a robotic-arm transfer station) and packing station 108.

Figure 4A:
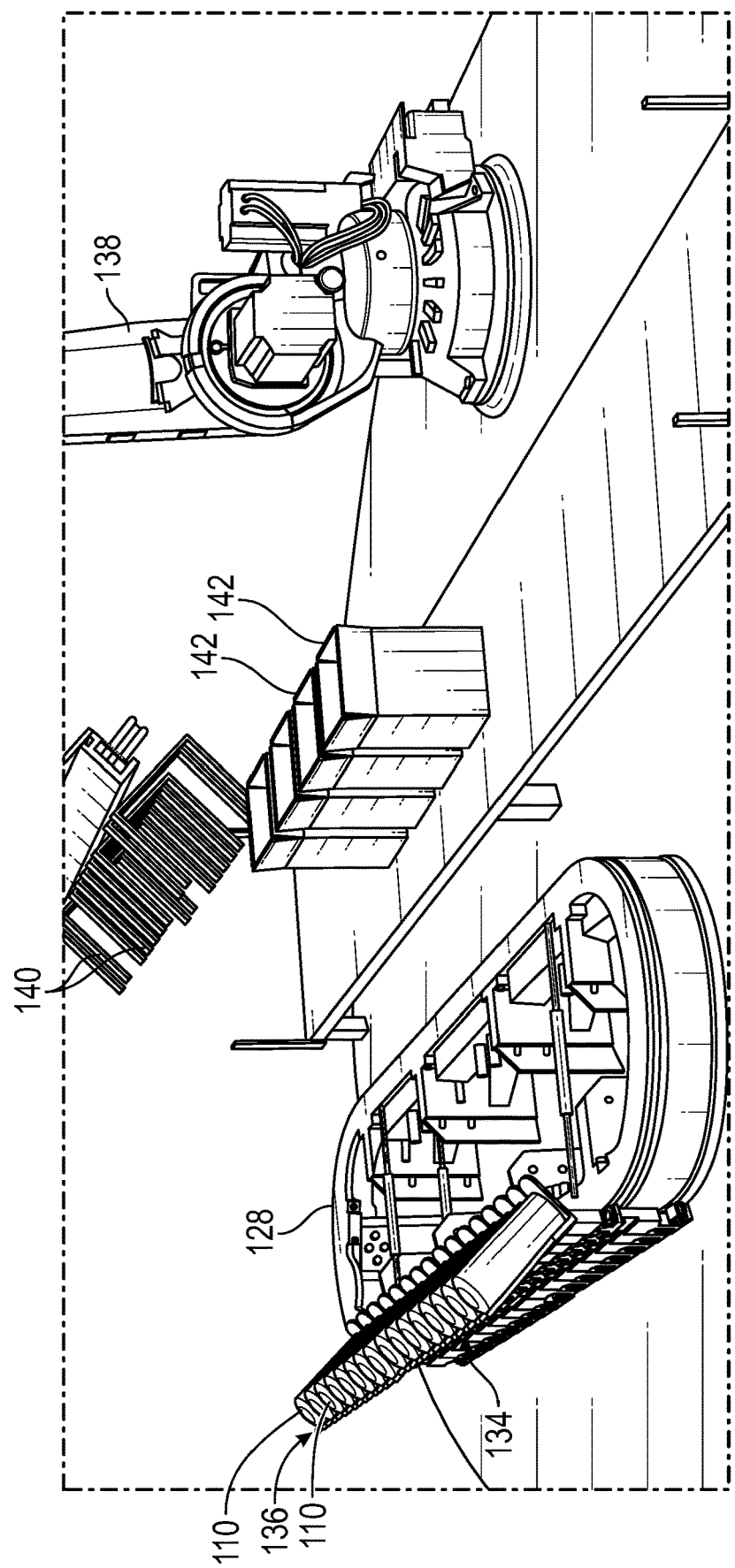
Figure 4B:
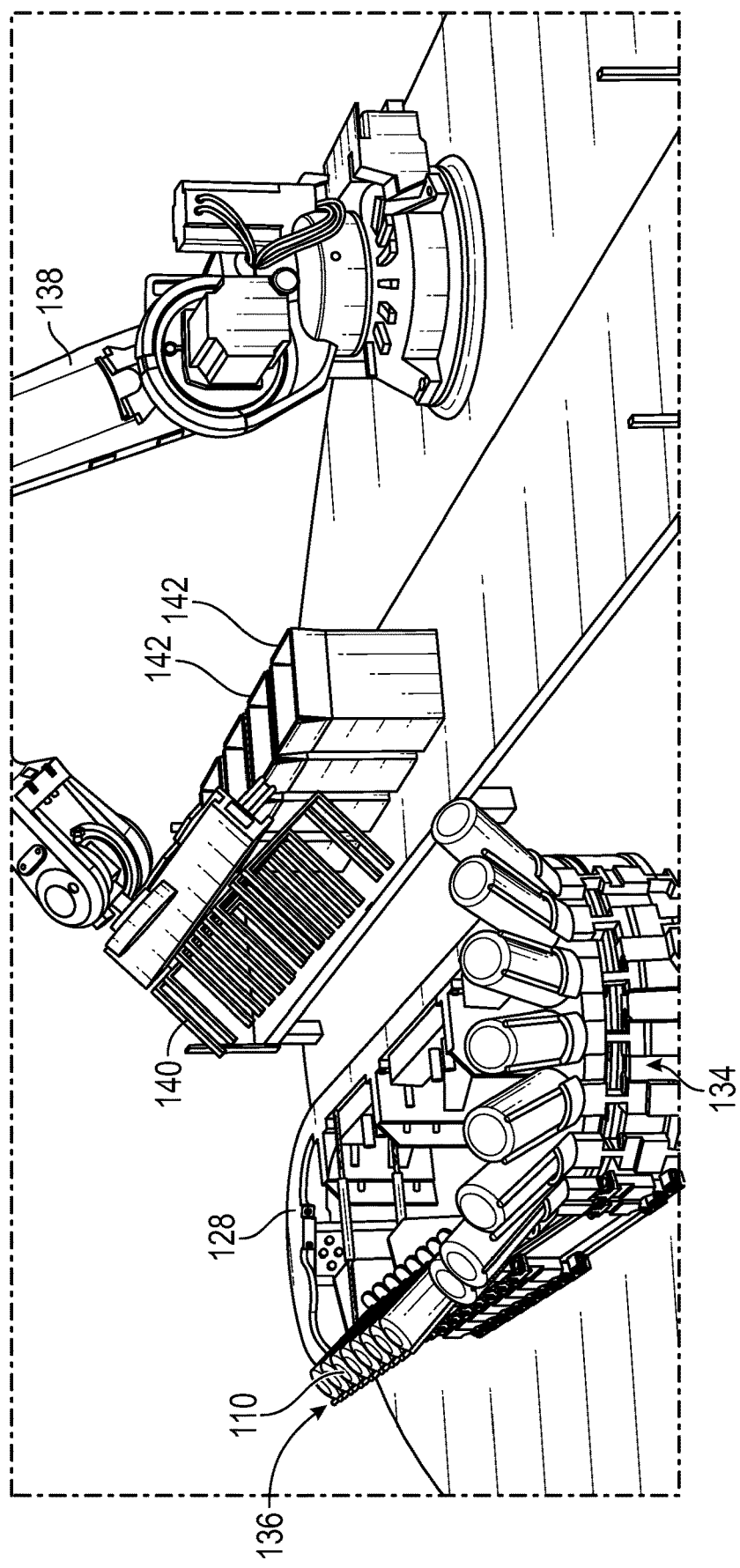
Figure 4C:
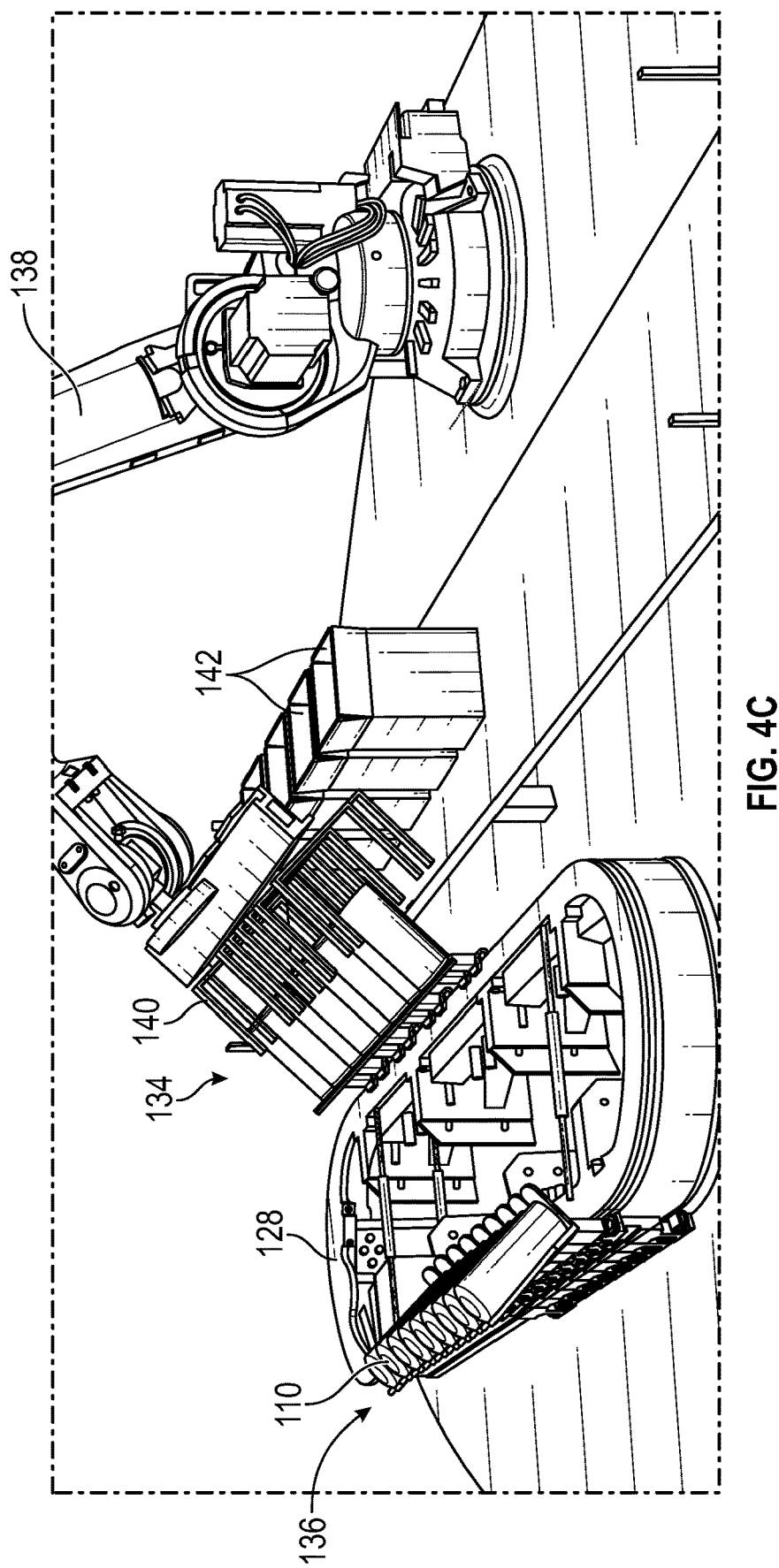

FIG. 4A-4C illustrates a first group 134 of the plurality of products 110 being shuttled by the shuttle members 120 from an initial loading position to a position in which the second transfer station 106 (e.g., robotic arm transfer station) can engage with the first group 134. As the first group 134 moves to engage with the second transfer station 106, a second group 136 can move into the position where the first group 134 (e.g., FIG. 4A) was initially positioned. In this manner, each additional group can be successively formed and moved into position for movement to the next station.

As shown in FIG. 4B, as the shuttle members 120 approach the second transfer station 106, a robotic arm 138 with a plurality of product gripping members 140 can move into position to engage with the first group 134 of products 110.

Figure 4E:
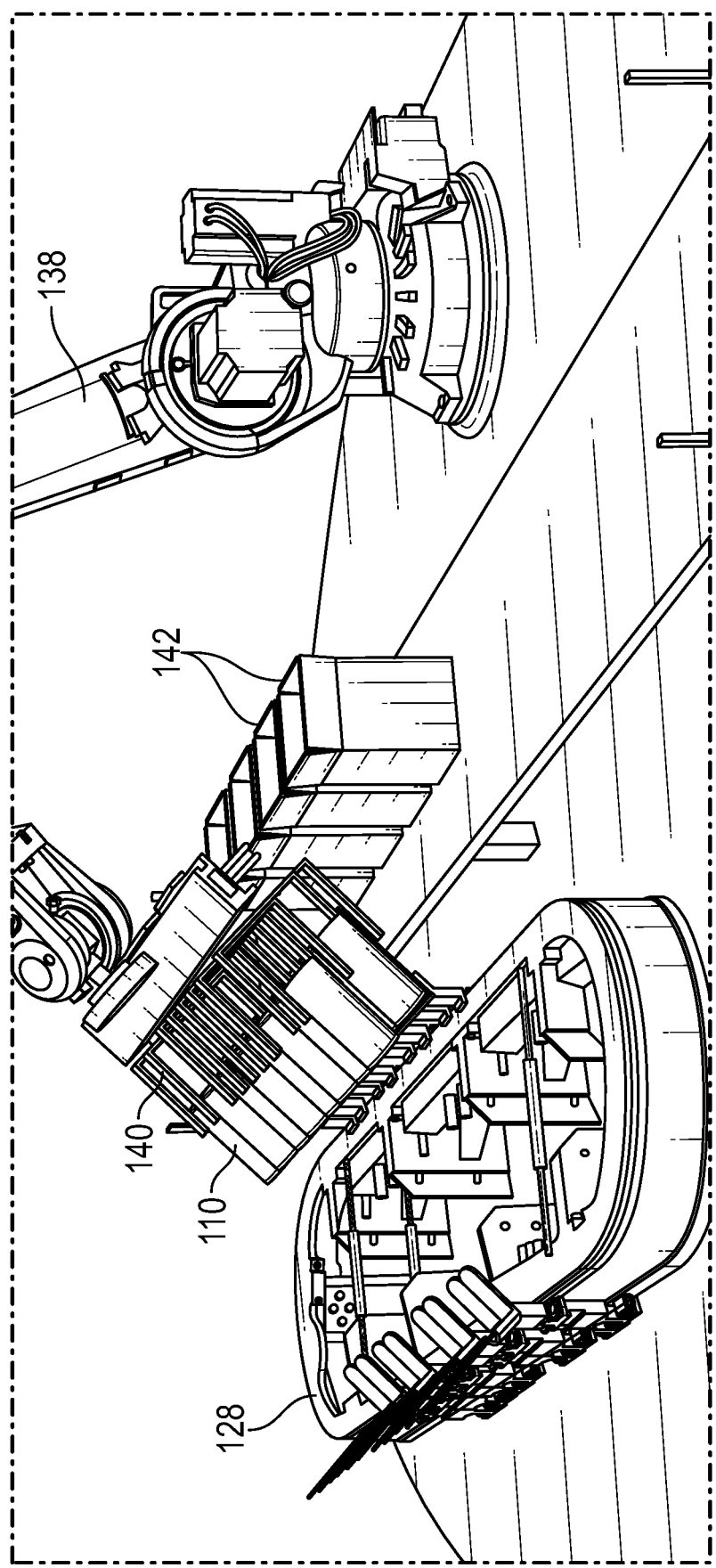
Figure 4F:
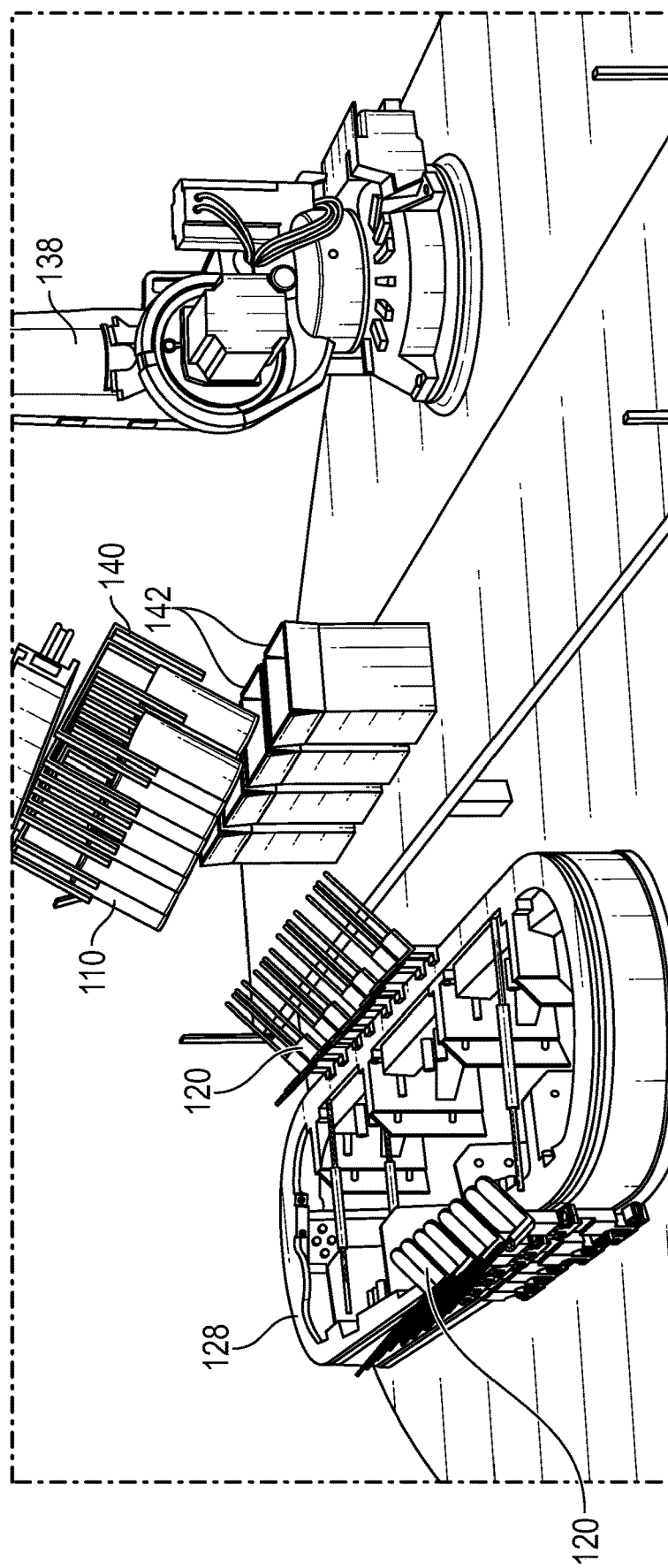
Figure 4G:
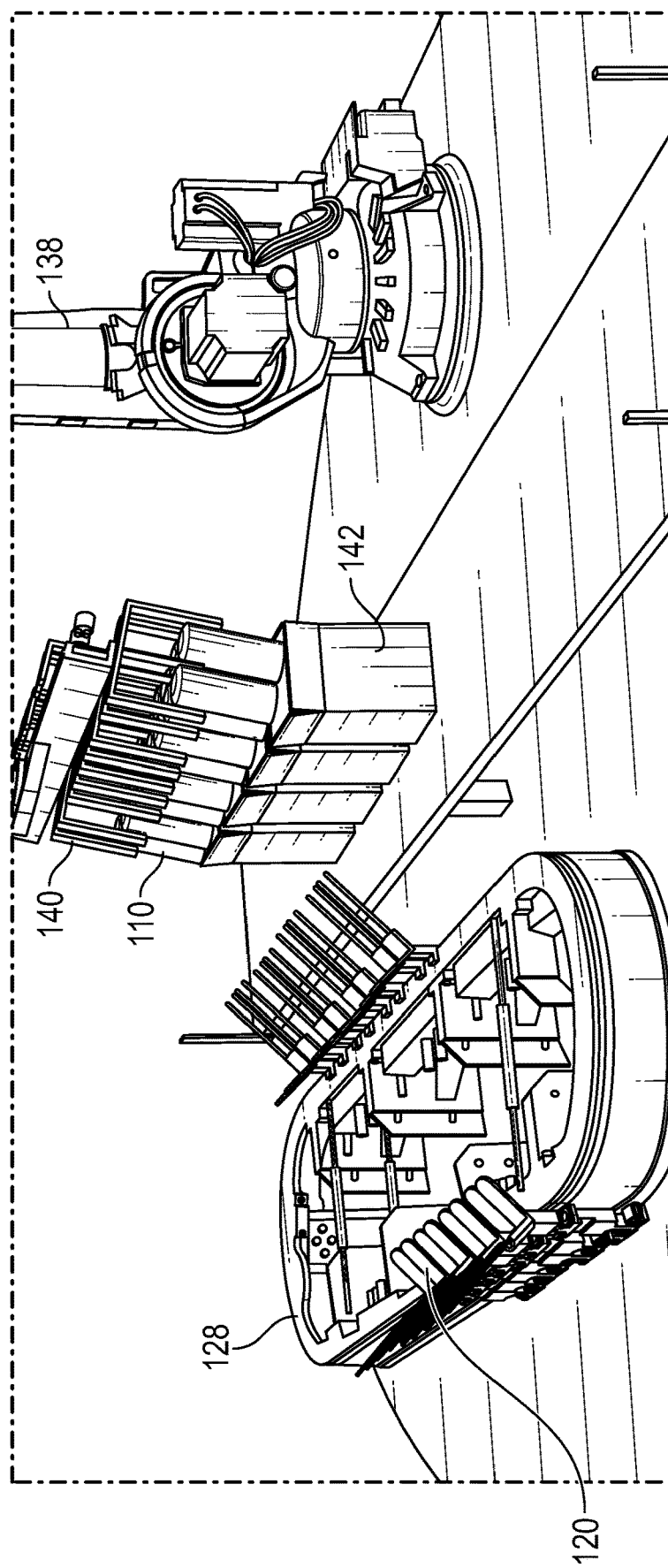
Figure 4H:
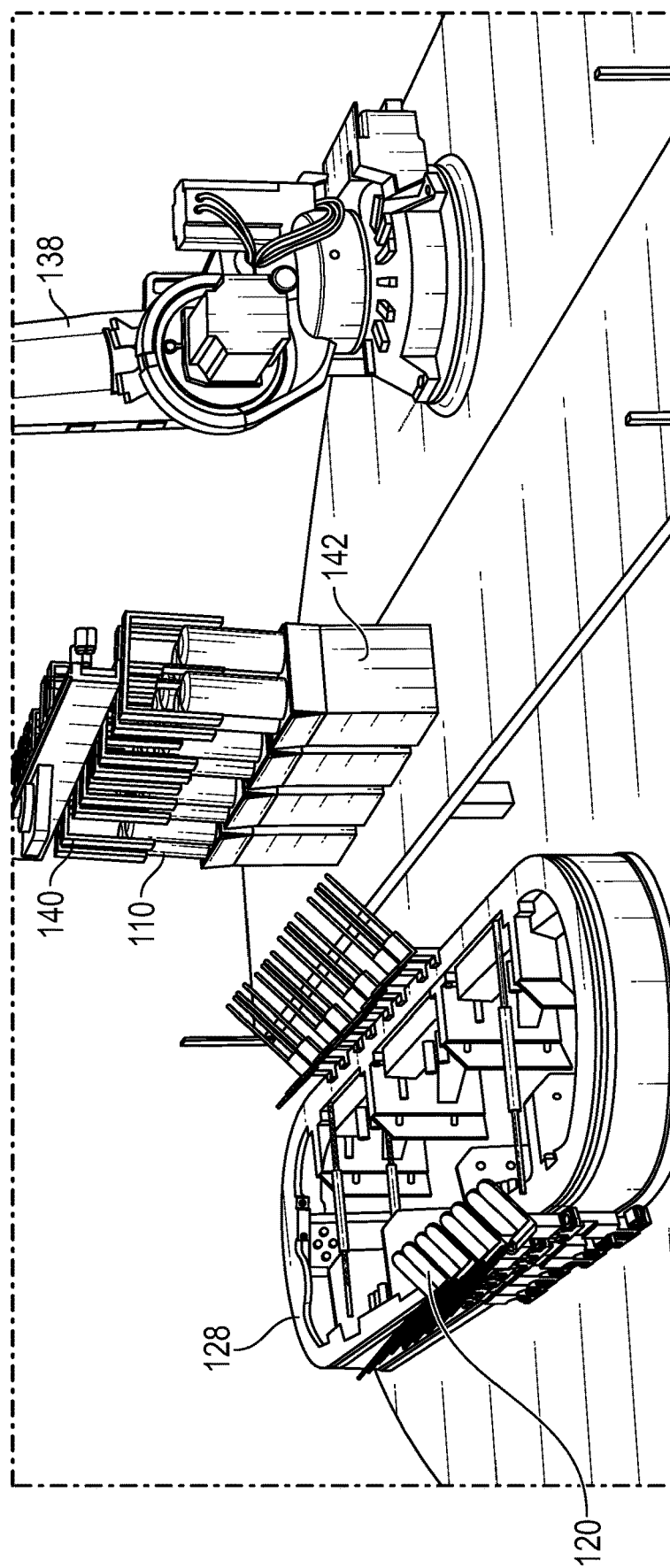
Figure 4I:
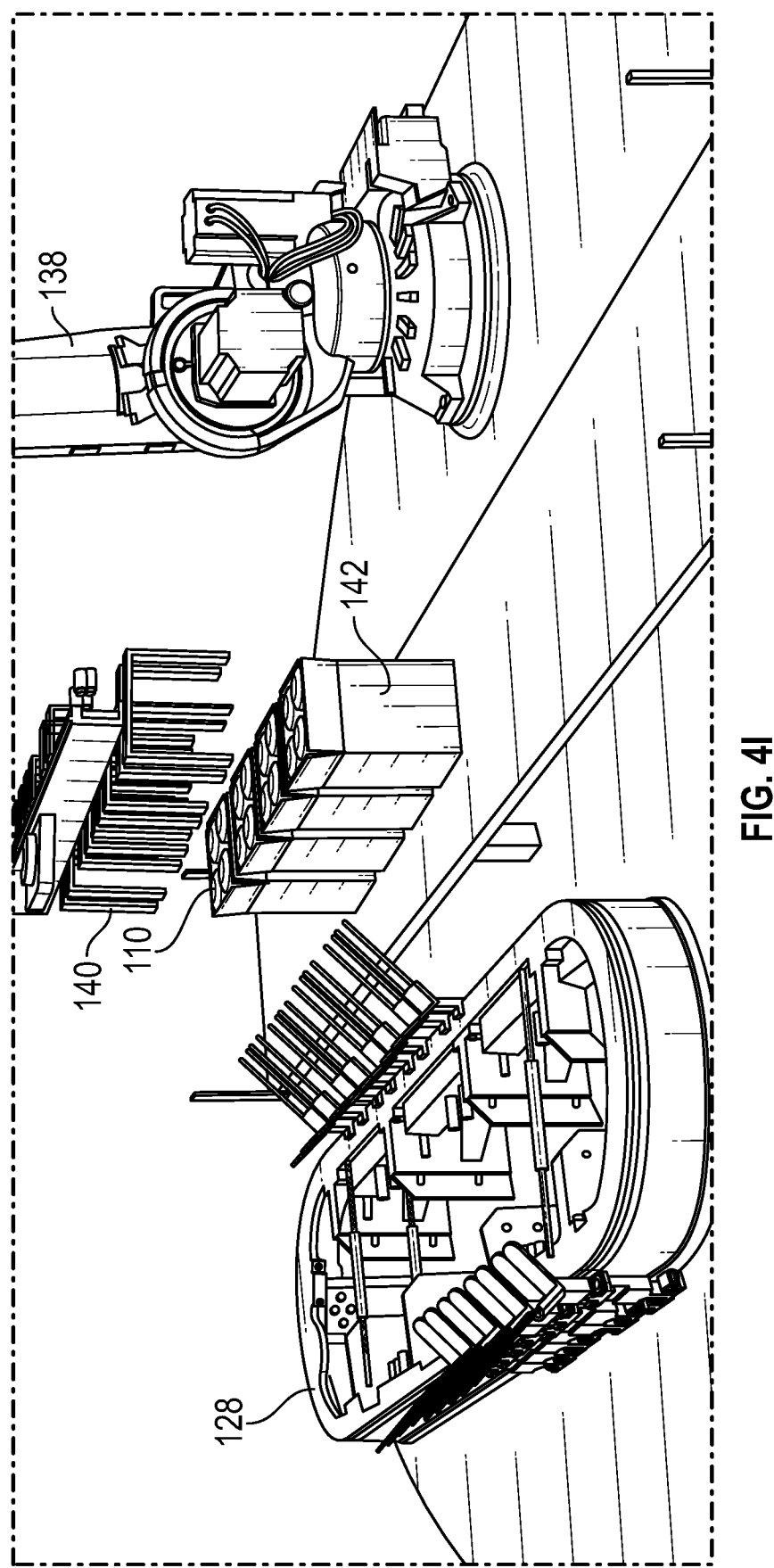

In some embodiments, such as the embodiment illustrated in FIGS. 4A-4J, the robotic arm 138 can have a first group of product gripping members configured to engage with the first group 134 of products (e.g., FIG. 4C) and a second group of product gripping members configured to engage with the second group 136 of products (e.g., FIG. 4E).

As the products 110 are transferred from the shuttle members 120 to the gripping members 140 of the robotic arm 138, the empty shuttle members 120 can continue along the track 128 and return to the initial starting position to receive additional products 110. This is shown, for example, in FIGS. 4D and 4E with respect to the shuttle members 120 that transferred the first group 134 of products 110.

After the plurality of products 110 of both groups (134, 136) have been transferred to the gripping members 140 of the robotic arm 138, the robotic arm 138 can transfer the products 110 to one or more containers 142. In the illustrated embodiment, the first group of products are held in a first row by the gripping members of the robotic arm and the second group of products are held in a second row by the gripping members of the robotic arm. In this manner, the robotic arm can move a plurality of rows of products to the one or more containers in the same motion. In addition, in the illustrated embodiment, the plurality of products are moved from the first transfer station 104 to a plurality of containers 142 in one movement. That is, the plurality of gripping members 140 engage with multiple rows of products 110 that are subsequently delivered to multiple containers 142 (e.g., FIG. 4G-4I).

Although gripping members 140 are illustrated with two rows, it should be understood that additional rows can be provided by adding additional pairs of gripping members that can receive additional product for a third, fourth, fifth, or more rows. In some embodiments, the number of rows are therefore two or more rows, two to five rows, or two to four rows.

Figure 4J:
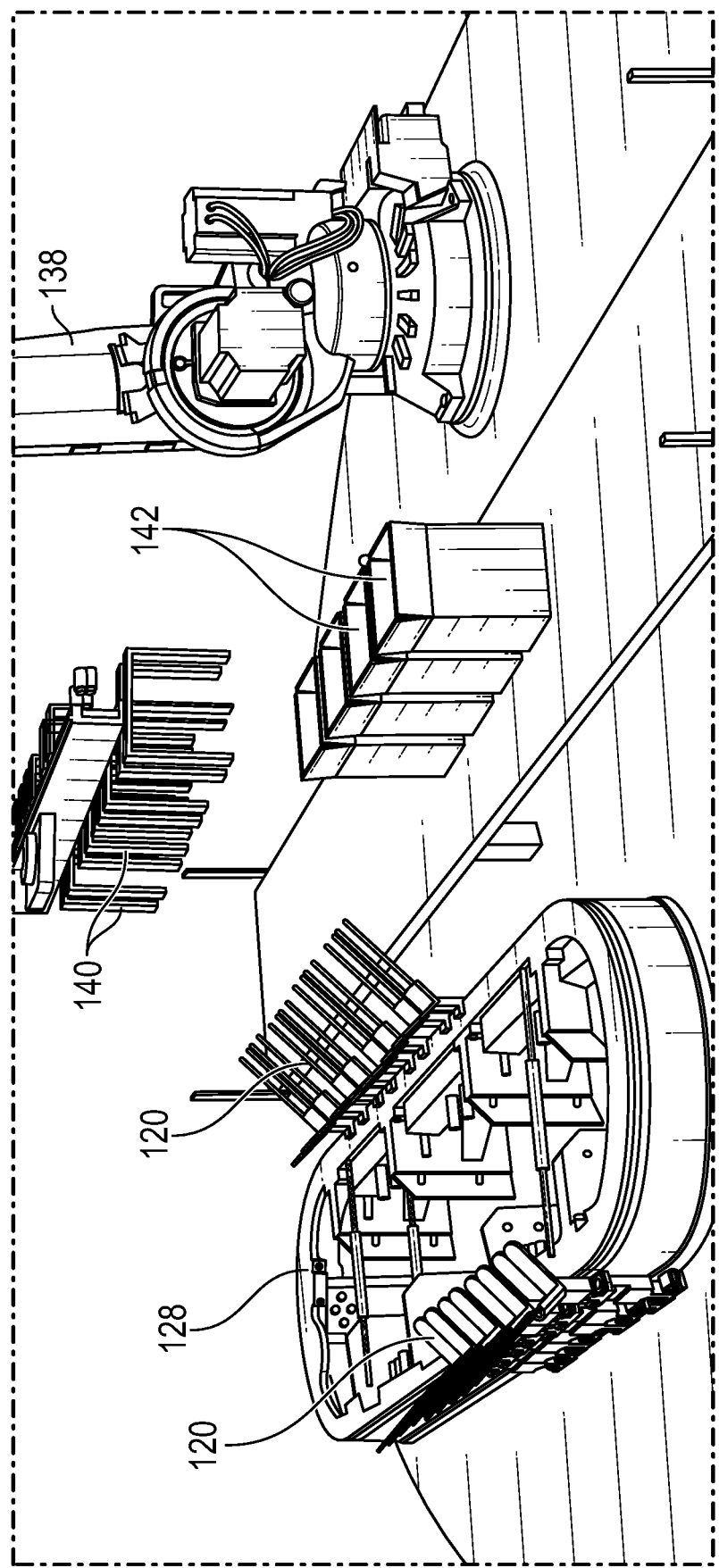

After the plurality of products 110 are delivered to the one or more containers 142, the filled containers can be transferred away from a loading position (e.g., FIG. 4I) for downstream processing as shown in FIG. 4J (e.g., the filled containers move in the direction of arrow 144). This can be achieved, for example, by providing a conveyor belt 146 or other suitable transfer mechanism.

FIGS. 5A-5F illustrate an exemplary embodiment in which a plurality of shuttle members 120 can move along an exemplary track 128. In the exemplary embodiment, shuttle members are identified as 1-30 and their movement is illustrated at different times in a dynamic case staging process.

Figure 5A:
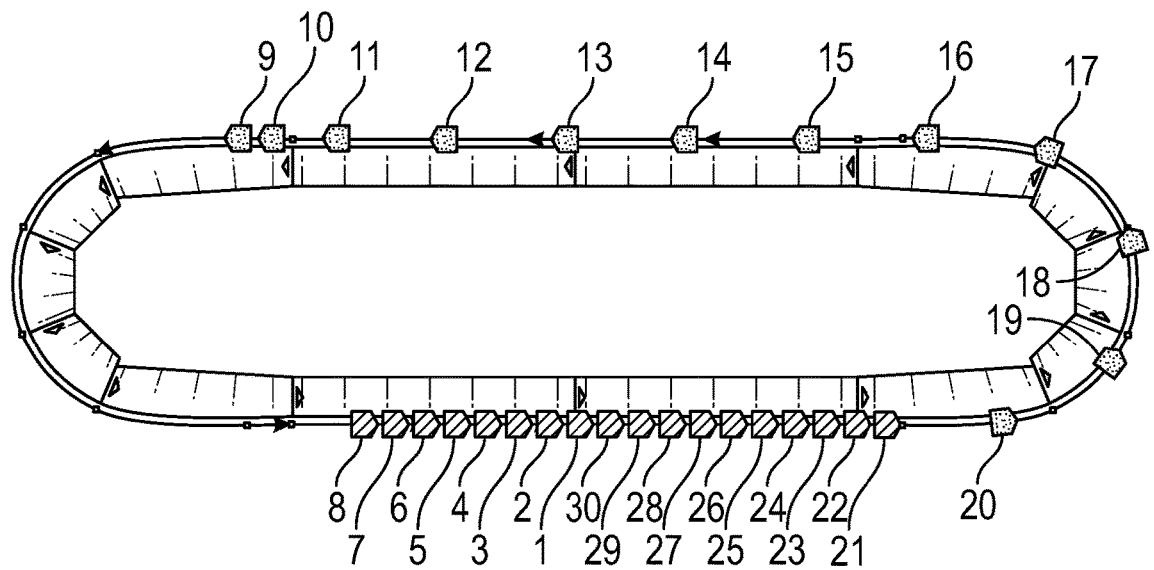
FIGS. 5A-5F illustrate exemplary systems and method of moving shuttle members on a track to position products for receipt by a transfer station.
Figure 5B:
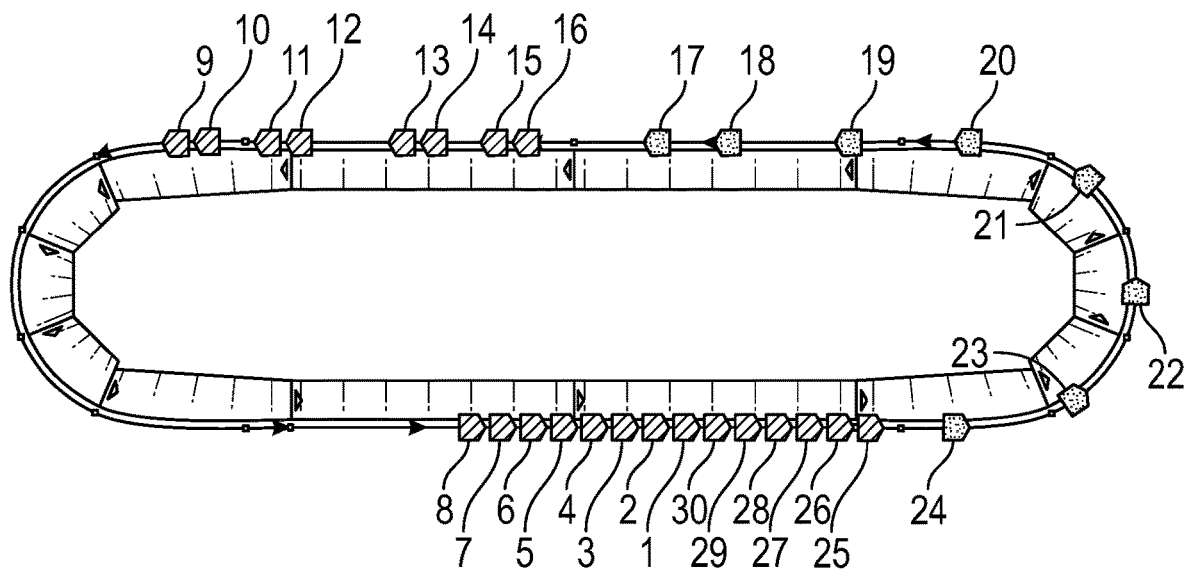
Figure 5C:
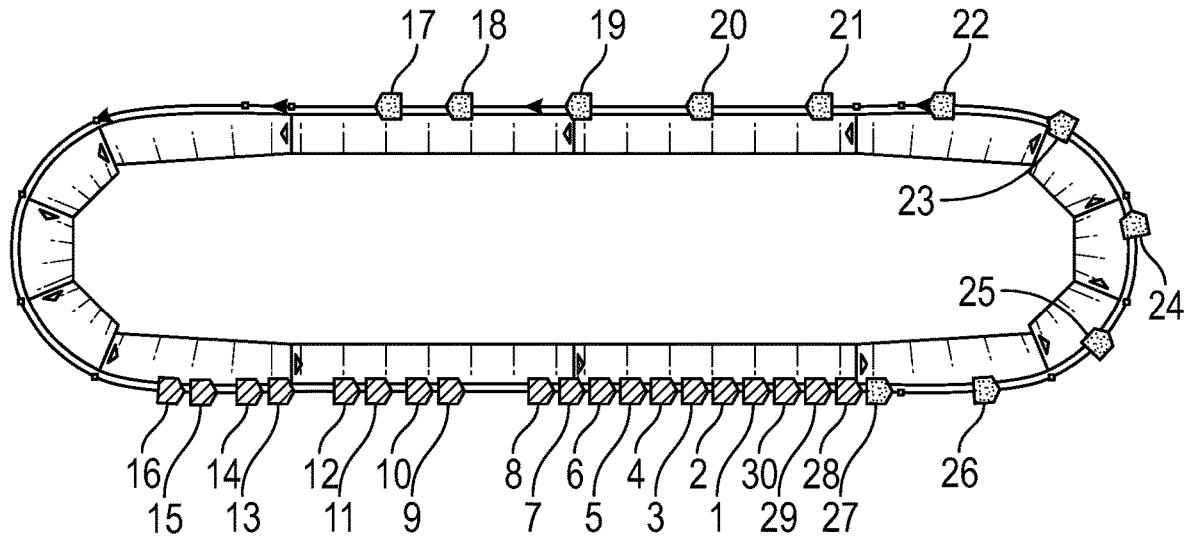
Figure 5D:
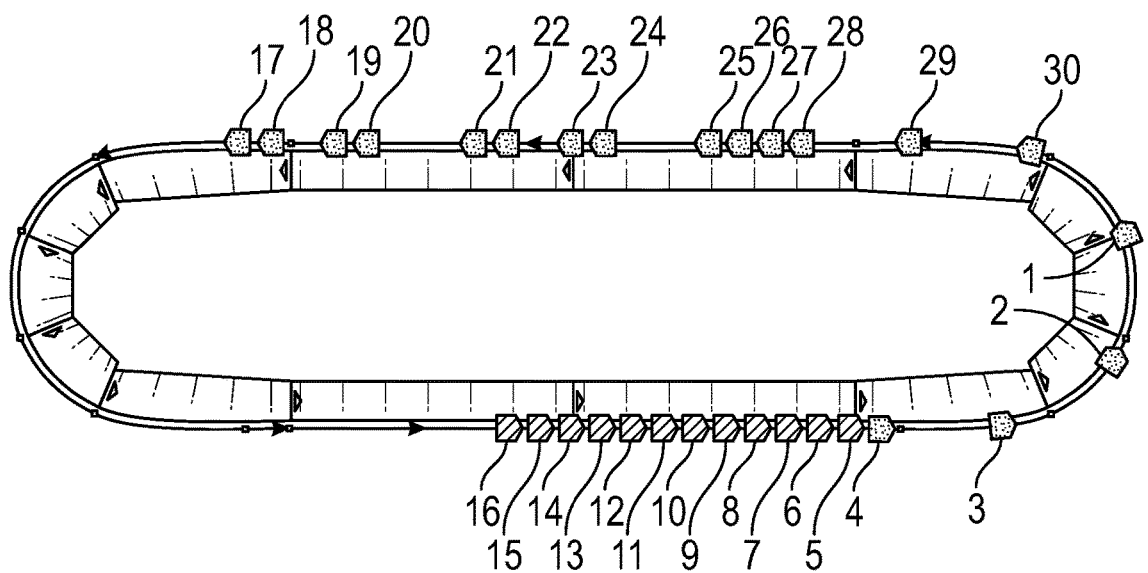
Figure 5E:
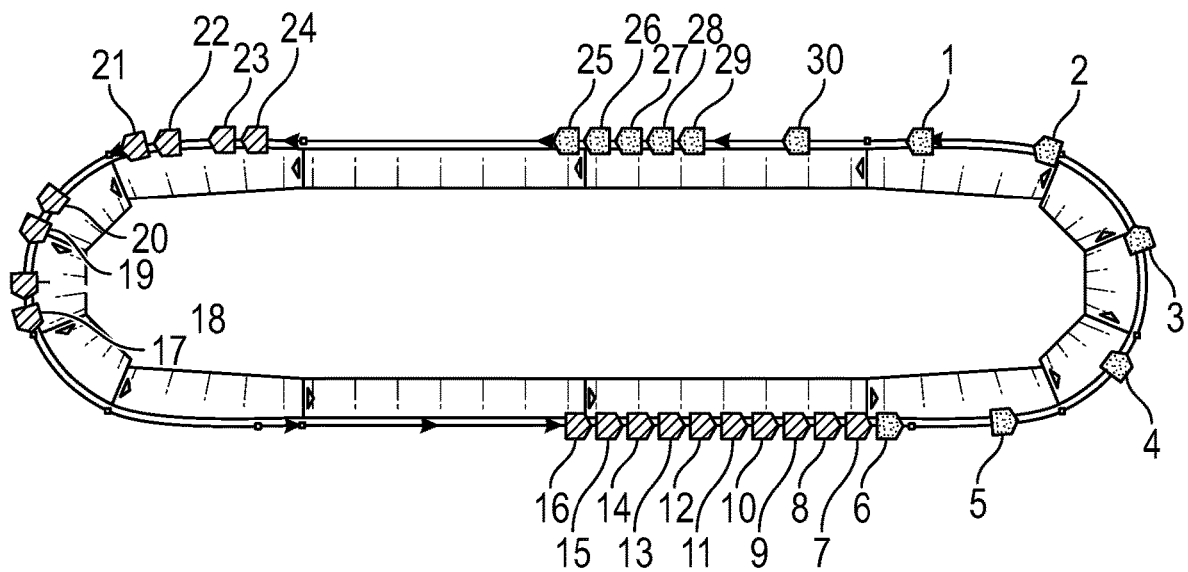
Figure 5F:
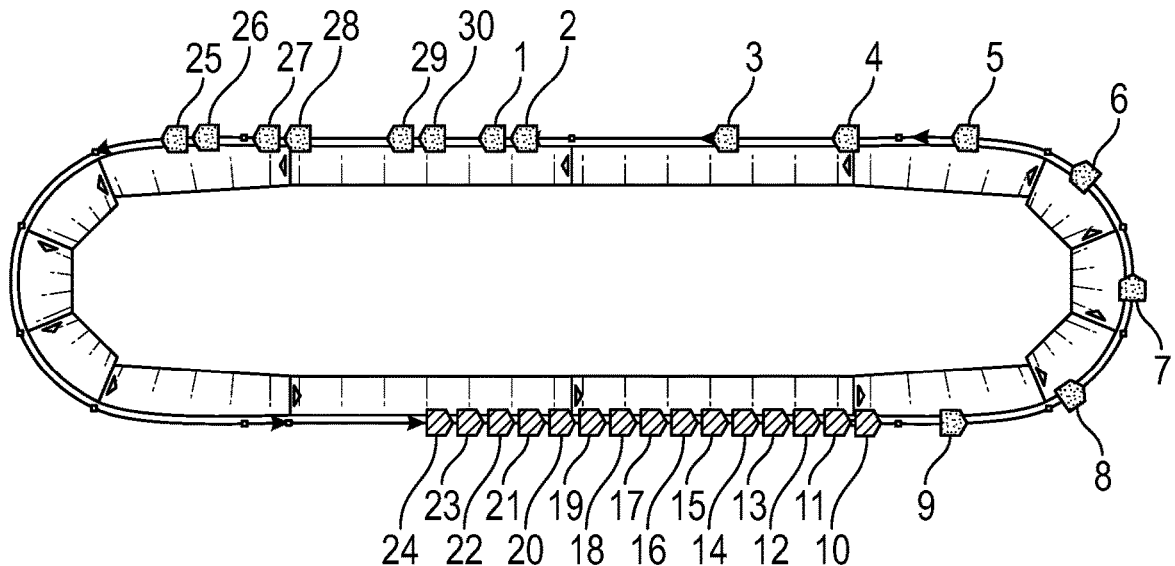

For example, FIG. 5A illustrates shuttle members 9-16 moving into position for pickup by the robotic arm (not shown for convenience). Once those shuttle members are in position (FIG. 5B), the robotic arm picks up the products positioned thereon (also not shown for convenience). After the products on shuttle members 9-16 are picked up, those empty shuttles move back around to an initial position for reloading (e.g., FIGS. 5C-5D). At this time, another group of products, conveyed by shuttle members 17-24 are moved into position for pickup by the robotic arm (FIGS. 5C-5D). Again, after the robotic arm removes the associated product, the empty shuttle members return to an original position and another group of shuttle members (and products) move into position to be picked up by the robotic arm (FIGS. 5E-5F).

Figure 6A:
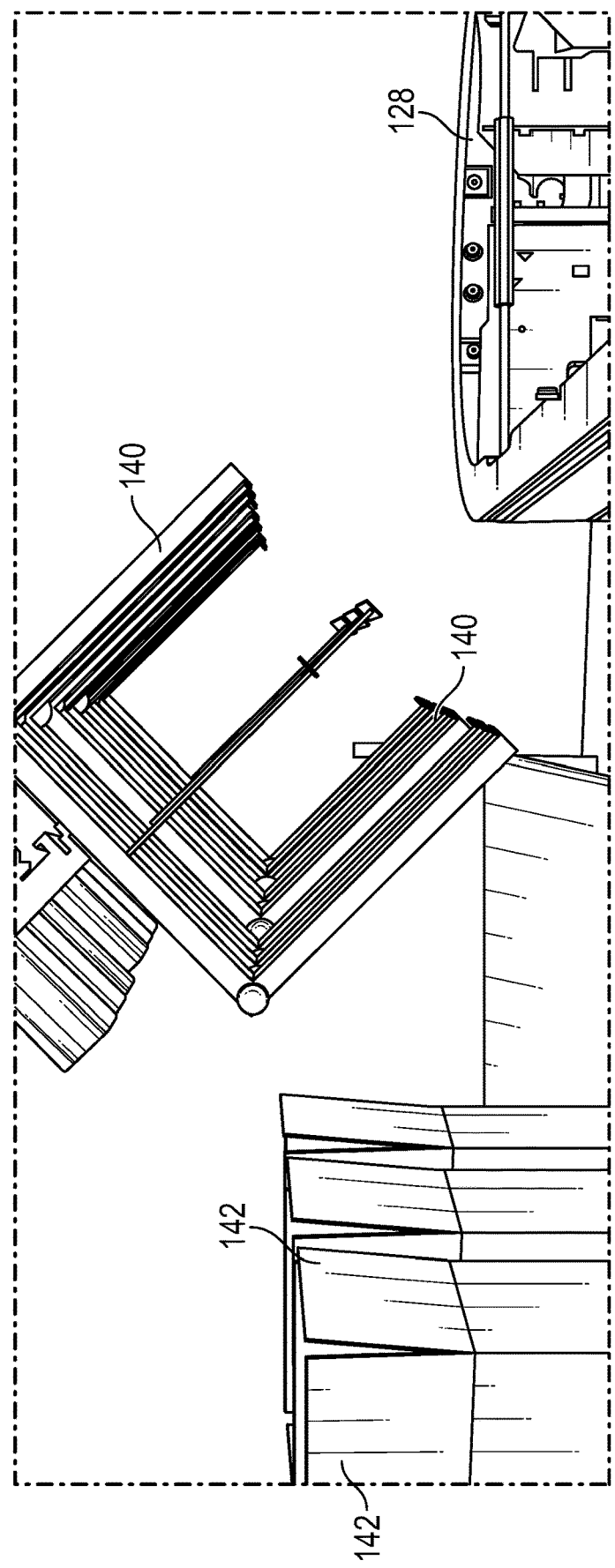
FIGS. 6A-6G illustrate an exemplary method of transferring products from a plurality of shuttle members to a plurality of gripping members of a robotic arm.
Figure 6B:
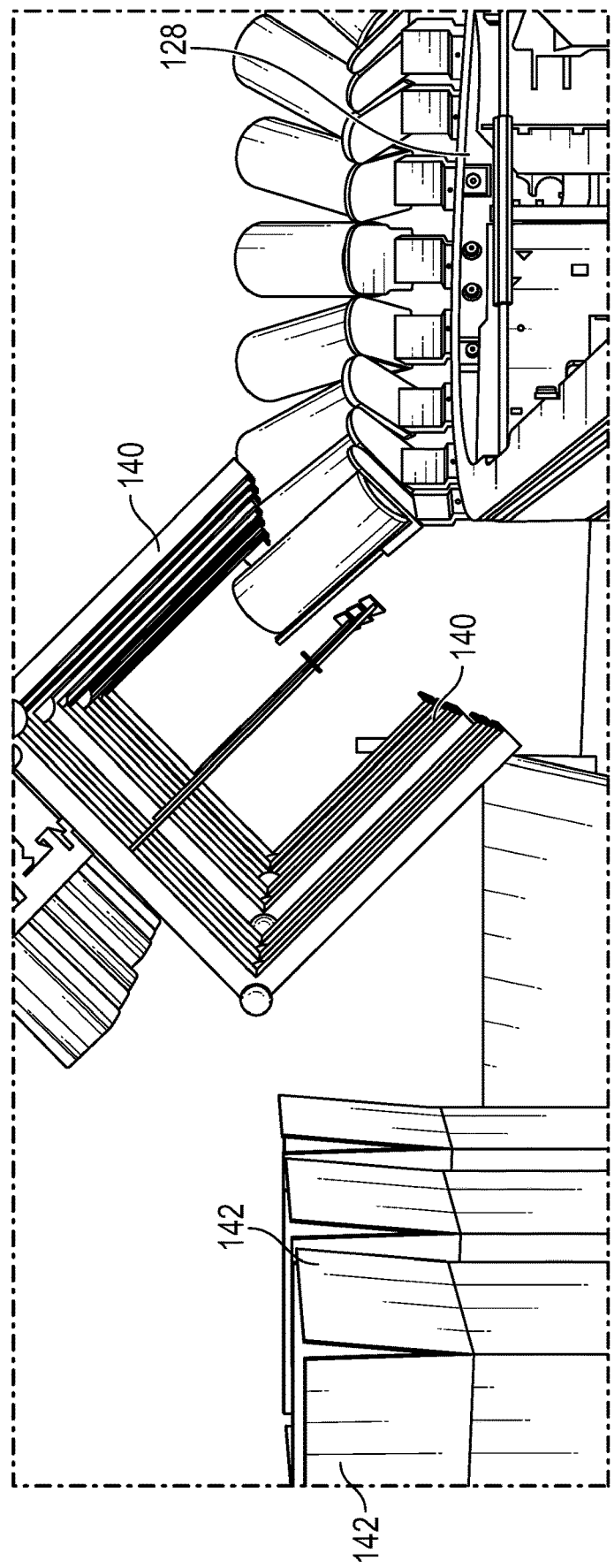
Figure 6C:
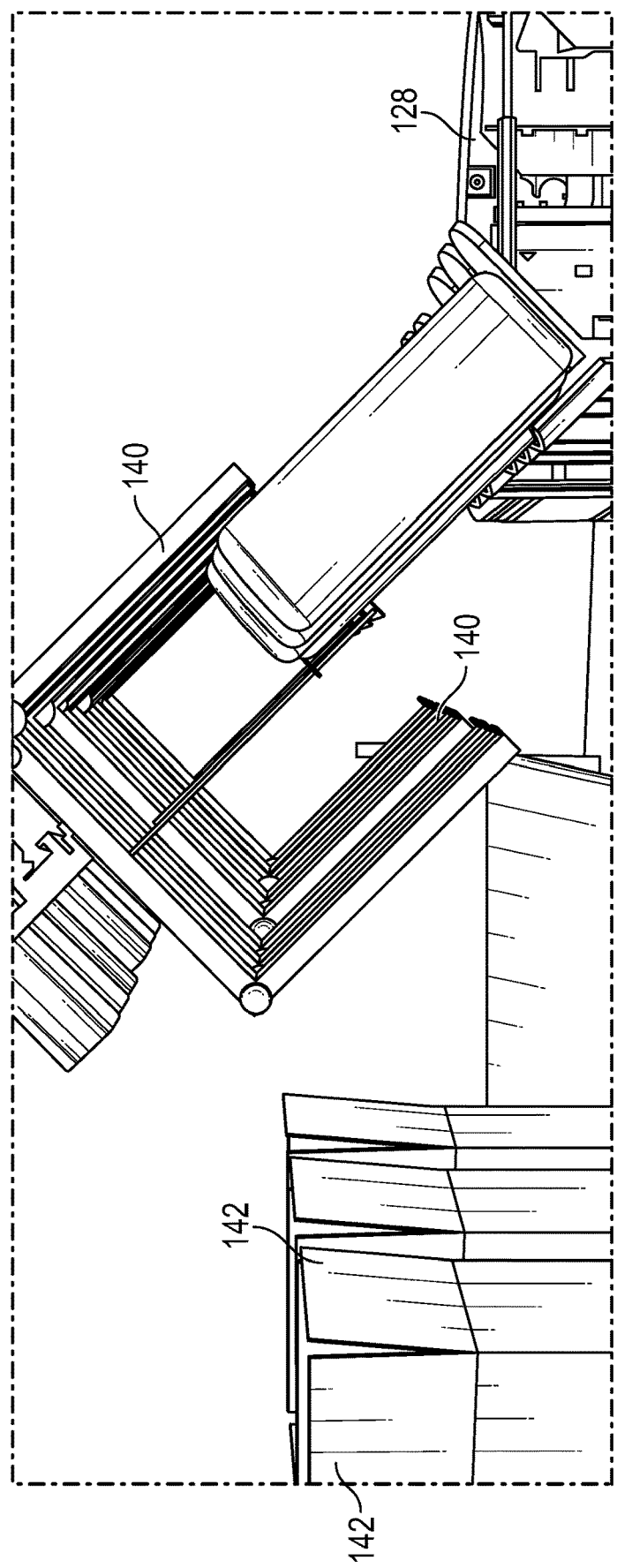

FIGS. 6A-6G and FIGS. 7A-7B illustrate additional details of an exemplary pickup of products using a plurality of gripping members of the robotic arm. FIG. 6A illustrates a plurality of gripping members 140 in position to engage with a first group of products 110 conveyed by a plurality of shuttle members 120. FIG. 6B illustrates the first group of products 110 moving into position for pickup and FIG. 6C illustrates the first group of products 110 being picked up by the plurality of gripping members (e.g., a first plurality of gripping members).

Figure 6D:
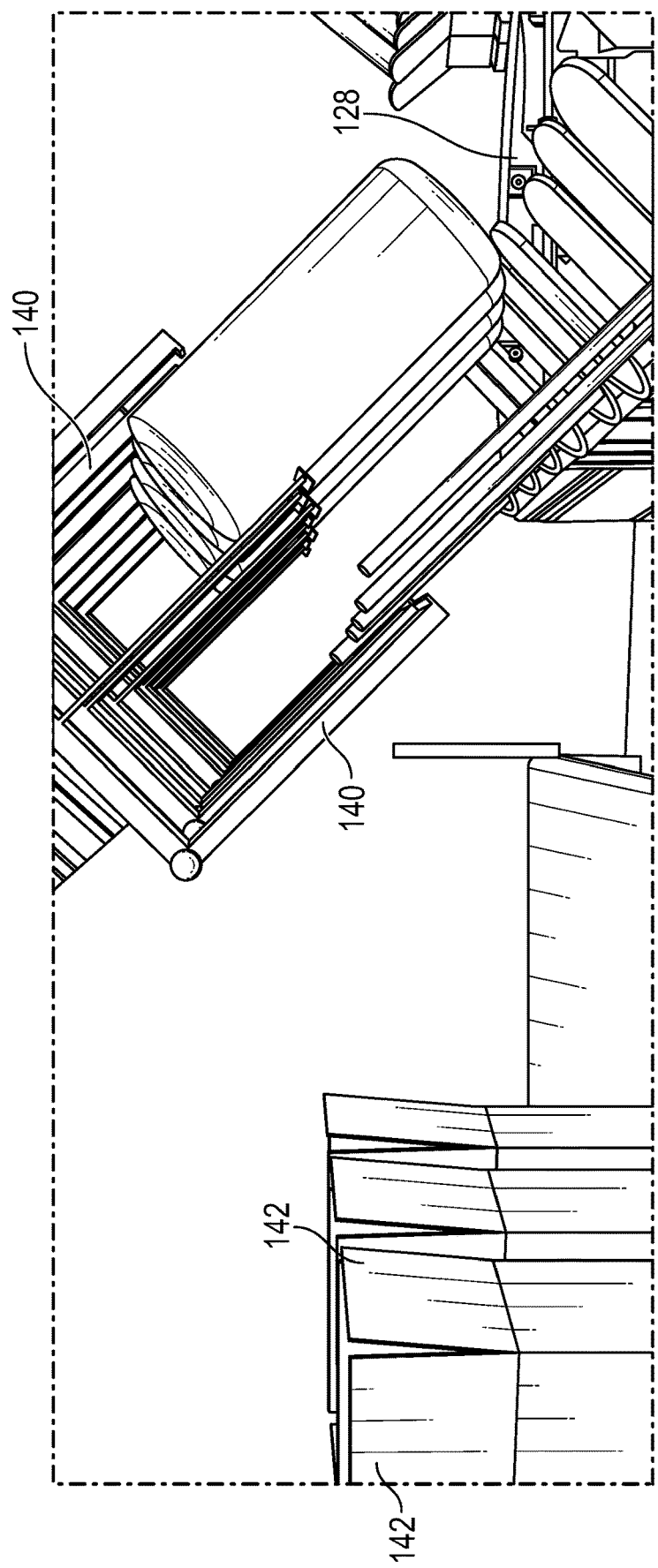

As the first group of products are picked up by the first plurality of gripping members, the empty shuttle members 120 can move back to their original positions to receive more product. As shown in FIG. 6D, in some embodiments, the shuttle members have at least a portion (e.g., arms 126) that extends between adjacent gripping members 140 of the robotic arm.

Figure 6E:
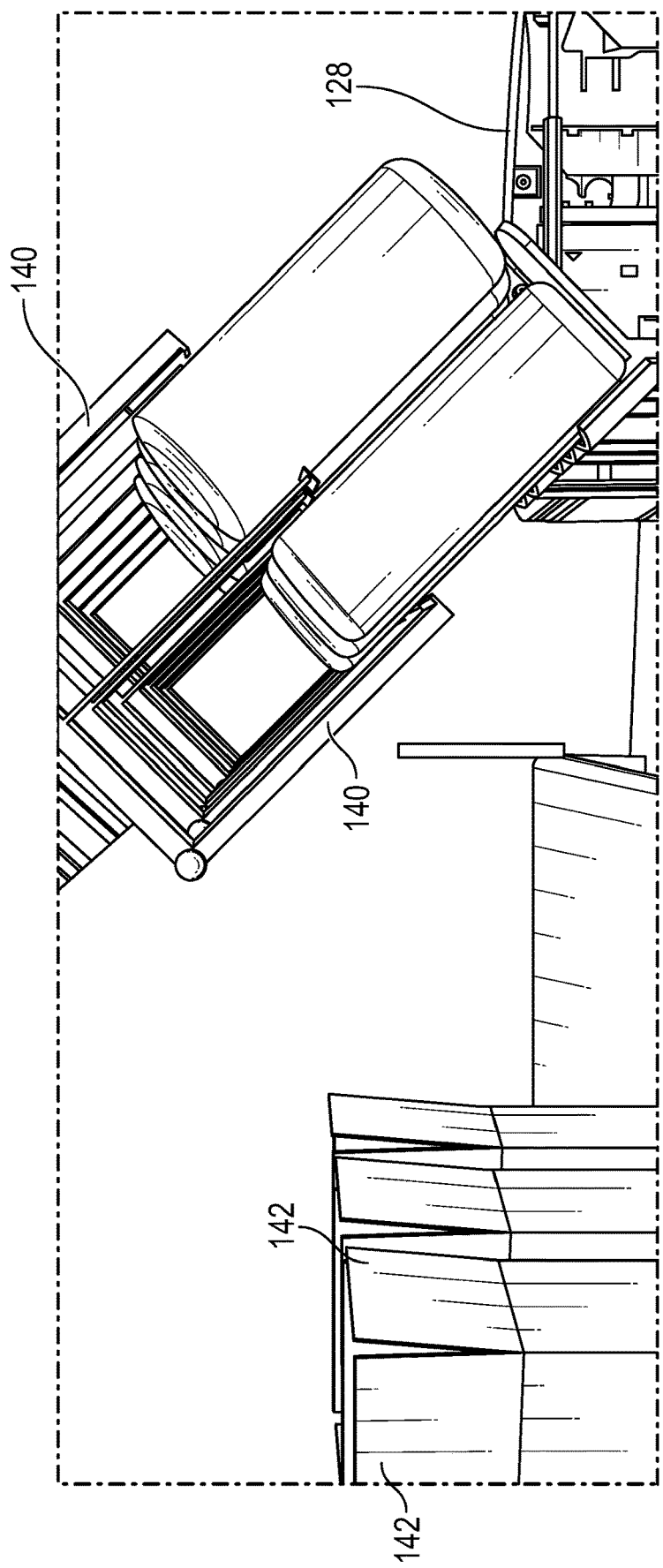
Figure 6F:
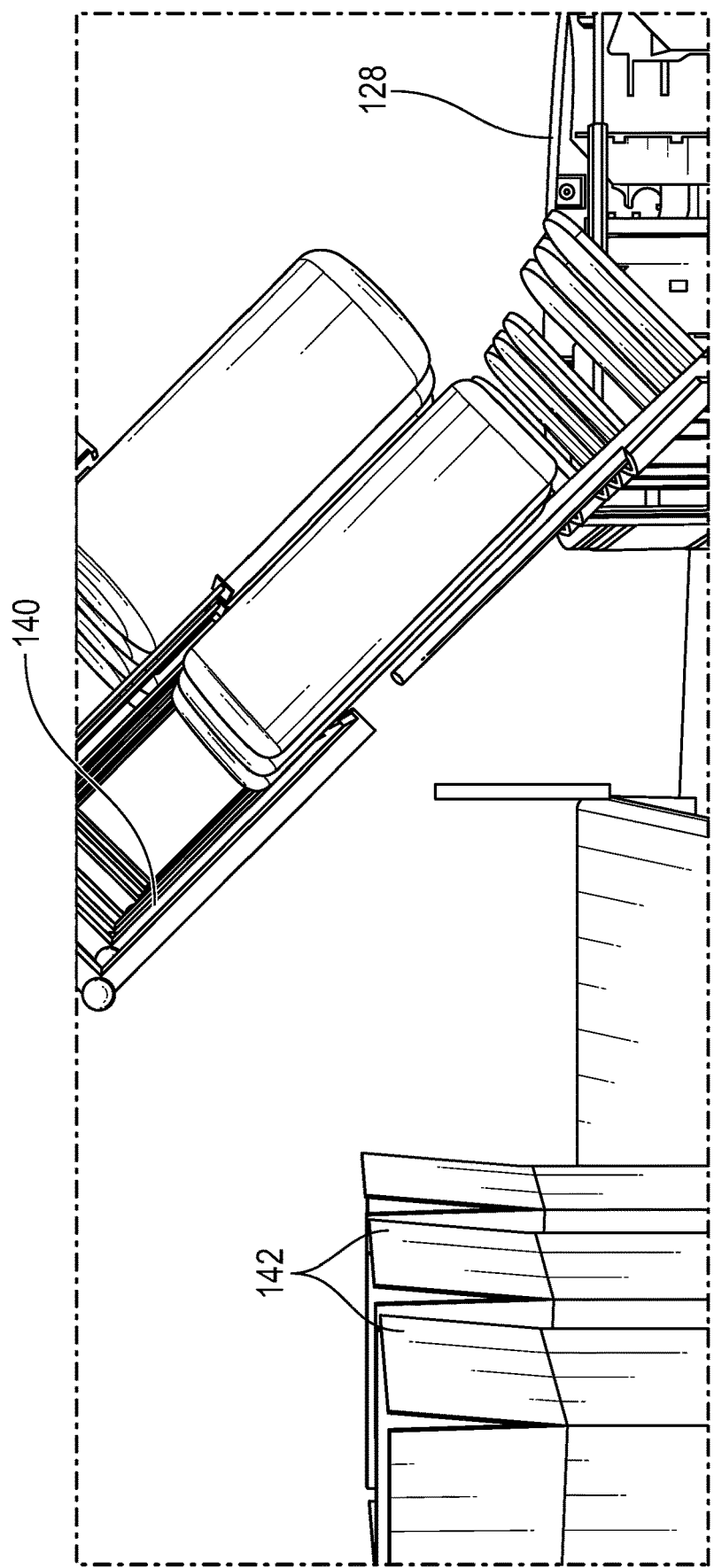
Figure 6G:
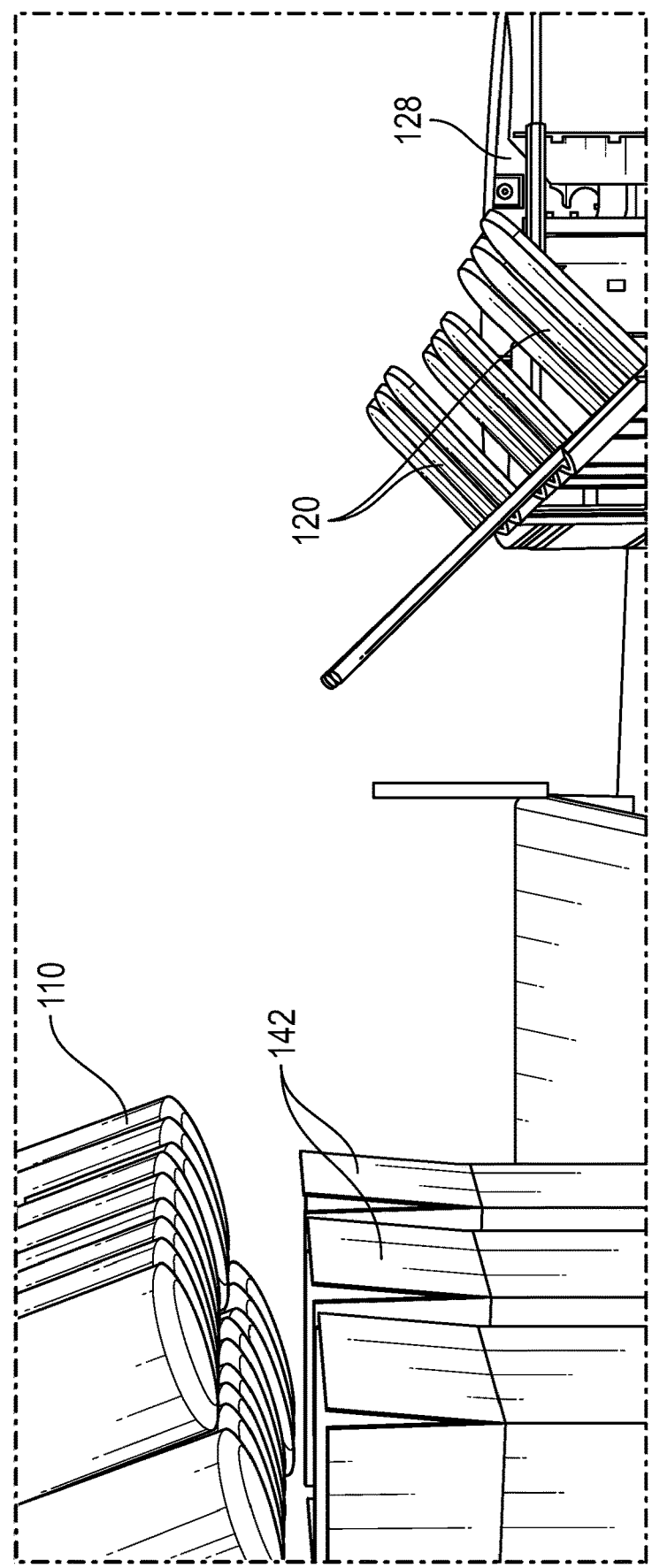

FIGS. 6E and 6F illustrate a second group of products engaging with a second plurality of gripping members of the robotic arm to provide a second row of products held by the robotic arm for transfer to one or more containers 142. As the products are removed from the shuttle members 120, the empty shuttle members can return to an original position as described herein.

Figure 7A:
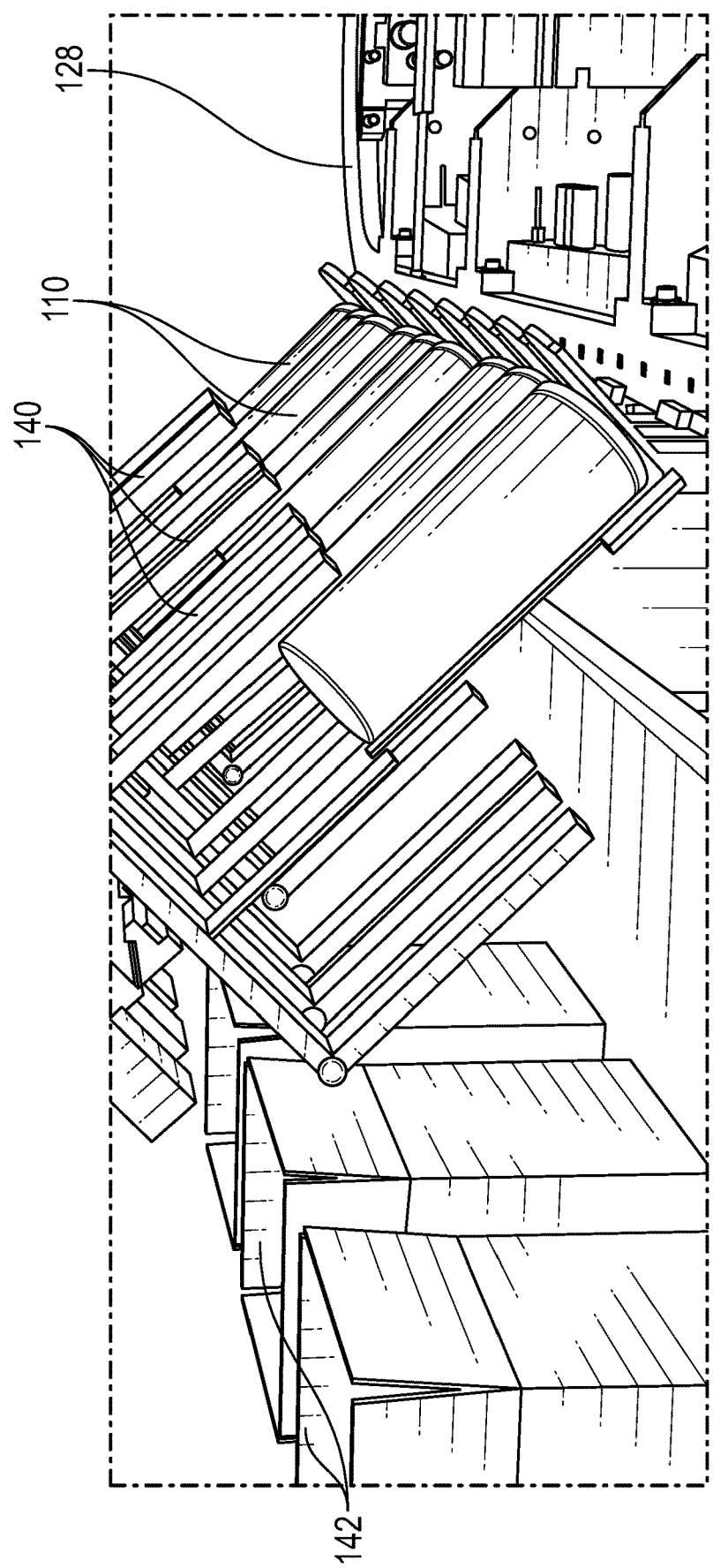
FIGS. 7A-7B illustrate additional details of the exemplary method of FIGS. 6A-6G.
Figure 7B:
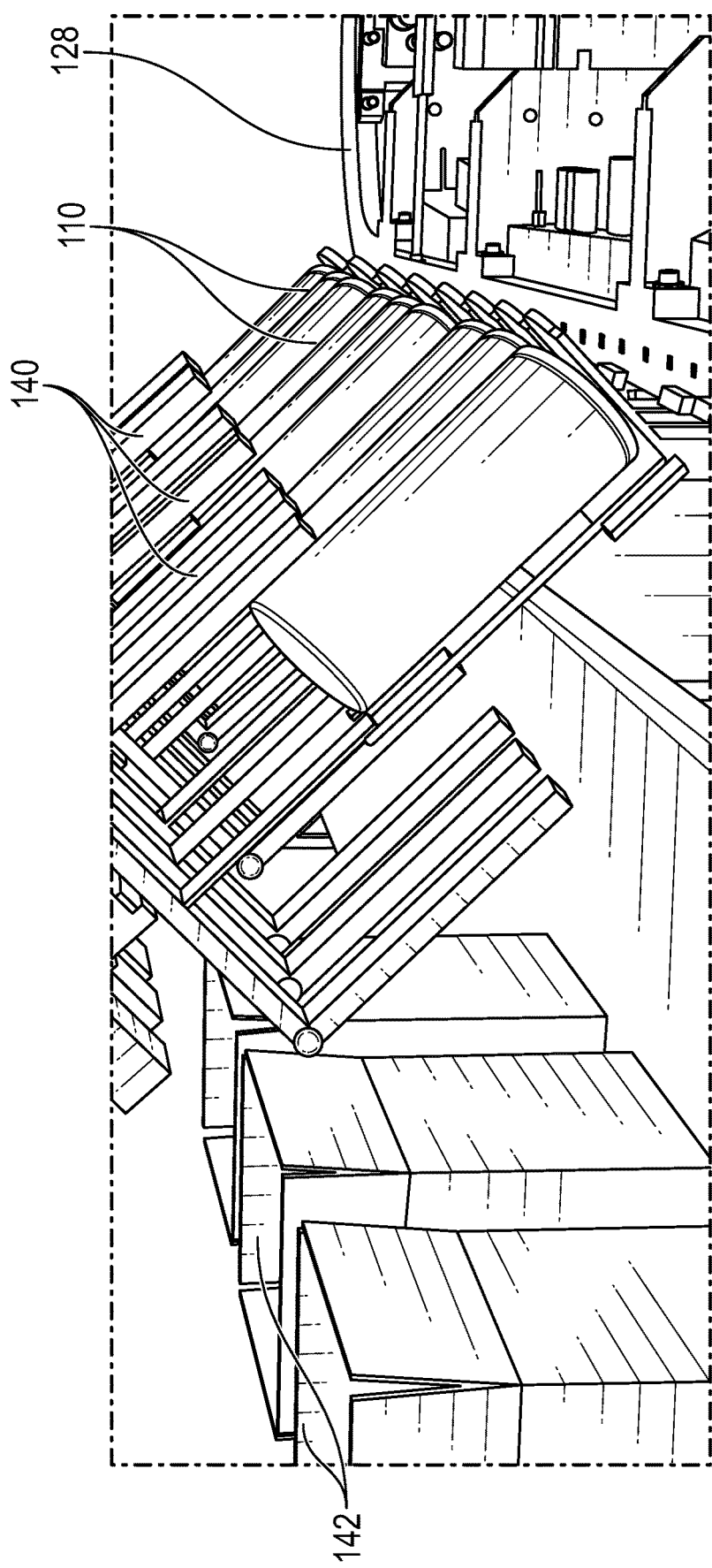

FIGS. 7A and 7B illustrate another view of the gripping members 140 of the robotic arm picking up respective ones of the products 110 from a first group. As shown in FIG. 7B, the gripping members 140 can move between respective pairs of arms 126 as the products are removed from the shuttle members 120.

Figure 8A:
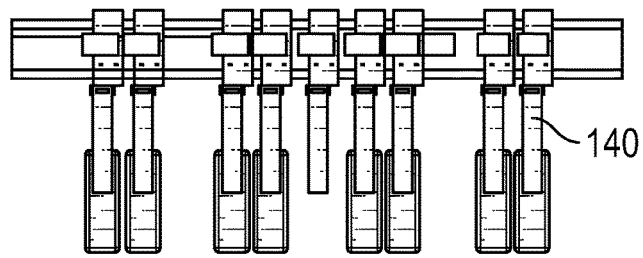
FIGS. 8A-8E illustrate exemplary positions of a plurality of gripping members and show the inherent flexibility of the packaging system to receive products of different shapes and sizes.
Figure 8B:
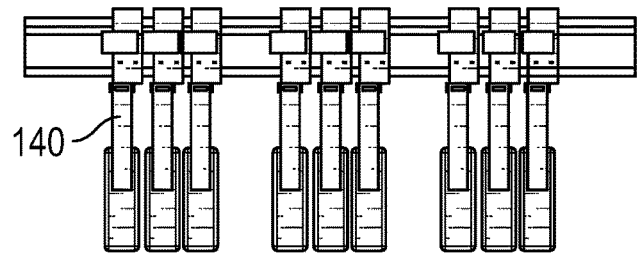
Figure 8C:
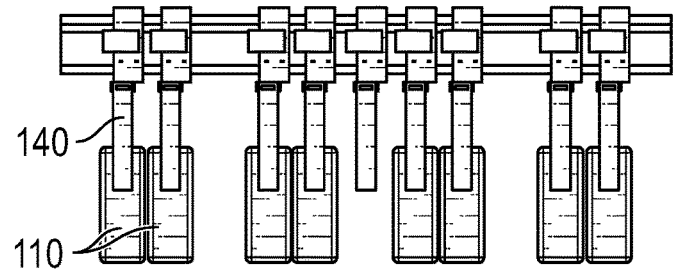
Figure 8D:
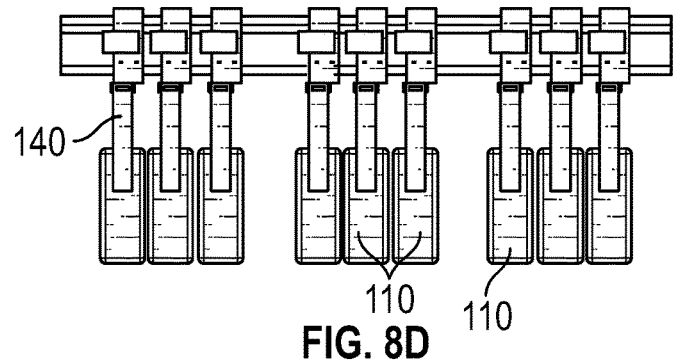
Figure 8E:
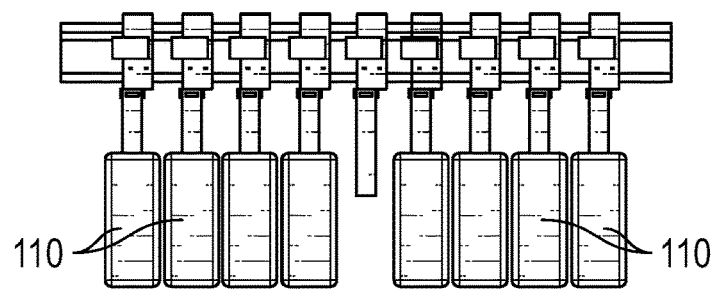

FIGS. 8A-8E illustrate an embodiment in which the gripping members of the robotic arm are adjustable to accommodate different products and packaging requirements. For example, FIGS. 8A-B illustrate a gripping arrangement for a smaller product that is configured for packaging in a container with two product per row (e.g., FIG. 8A) and configured for packaging in a container with three products per row (e.g., FIG. 8B). Similarly, FIGS. 8C and 8D illustrate a gripping arrangement in which a larger product can be packaged in the same manner (e.g., 2 per row in FIG. 8C; 3 per row in FIG. 8D). As shown in these figures, the grippers can be independently moveable to accommodate these different arrangements and sizes. In this manner, minor changes can be made to the location of the gripping members (manually or automatically) to allow for a quick and simple changeover between product packaging lines. In addition, because of the gripping member arrangement, various product heights can be accommodated without any customization required. FIG. 8E illustrates another gripping arrangement for an even larger product. In this exemplary arrangement, the gripping members can be moved to accommodate four products per row.

Figure 9:
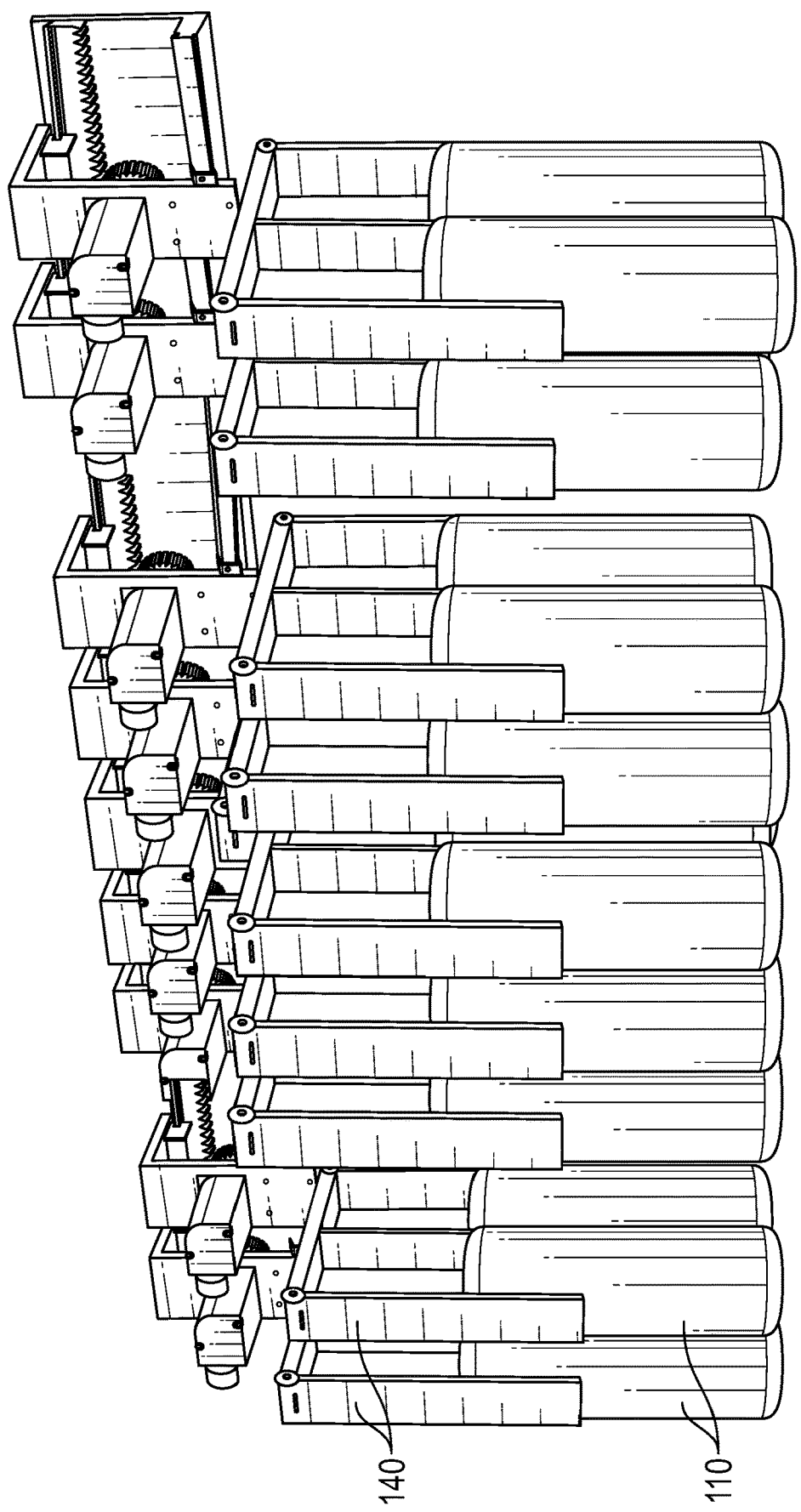
FIG. 9 illustrates addition features of an exemplary gripping system that includes independently moveable gripping members.

FIG. 9 illustrates an exemplary manner in which the gripping members can be readily, and independently, moved to accommodate different products and/or packaging requirements. In particular, FIG. 9 illustrates a rack and pinion linear actuation in which each gripping member can move linearly towards or away from an adjacent gripping member to create different spacings as desired between gripping members.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method of receiving and packing products, comprising:
   receiving a plurality of products at a first transfer station;
   delivering the plurality of products in discrete quantities to a plurality of shuttle members, the first transfer station being configured to deliver one of the plurality of products to each of the plurality of shuttle members;
   moving a first group of the plurality of shuttle members from a first position, in which a respective product of a first group of products is received on a respective shuttle member of the first group, along a path defined by a track to a second transfer station;
   moving a first plurality of gripping members of a robotic arm at the second transfer station into position to pick up the first group of the plurality of products from the first group of shuttle members, the first group of shuttle members being empty after the first group of products is picked up;
   moving the empty first group of shuttle members along the track to the first position to receive additional products thereon;
   moving a second group of the plurality of shuttle members from the first position, in which a respective product of a second group of products is received on a respective shuttle member of the second group, along the path defined by a track to the second transfer station;
   moving a second plurality of gripping members of the robotic arm at the second transfer station into position to pick up the second group of the plurality of products from the second group of shuttle members, the second group of shuttle members being empty after the second group of products is picked up; and
   moving the empty second group of shuttle members along the track to the first position to receive additional products thereon.

2. The method of claim 1, wherein the act of delivering the plurality of products in discrete quantities to a plurality of shuttle members comprises:
   moving the plurality of product along a platform that comprises a first surface and a second surface, angled relative to the first surface.

3. The method of claim 1, wherein the plurality of shuttle members each comprises a base surface and at least two spaced-apart arms that collectively support a respective product when positioned thereon, and the delivery of the plurality of products to each of the plurality of shuttle members comprises receiving a product that extends at least partly between the two spaced-apart arms of the shuttle member.

4. The method of claim 1, wherein the plurality of shuttle members are independently moveable along the path defined by the track.

5. The method of claim 1, wherein each of the plurality of shuttle members comprises one or more wheels, and a linear or rotary motor to drive the plurality of shuttle members along the track, and the act of moving the first group of the plurality of shuttle members comprises actuating the linear or rotary motor.

6. The method of claim 1, wherein the first plurality of gripping members comprises a first row of gripping members and the second plurality of gripping members comprises a second row of gripping members.

7. The method of claim 6, wherein the gripping members of each of the first row and second row are independently moveable relative to adjacent gripping members within a respective row, and the method further comprises moving at least some of the plurality of gripping members to adjust a distance between adjacent gripping members in each row.

8. The method of claim 1, further comprising:
transferring the plurality of products picked up by the first and second plurality of gripping members to one or more containers of a packing station.

9. The method of claim 1, wherein the path defined by the track is oval.

10. The method of claim 1, wherein the plurality of products are delivered into a container as a four pack, six pack, or eight pack.

* * * * *